United States Patent
Ibrahim et al.

(10) Patent No.: US 12,503,936 B1
(45) Date of Patent: Dec. 23, 2025

(54) FRACTURING FLUID RECOVERY WITH IONIC LIQUID

(71) Applicant: KING FAHD UNIVERSITY OF PETROLEUM AND MINERALS, Dhahran (SA)

(72) Inventors: Ahmed Mohamed Farid Ibrahim, Dhahran (SA); Khalid Zidan Ibrahim, Dhahran (SA); Ahmed Essam Mohamed, Dhahran (SA)

(73) Assignee: KING FAHD UNIVERSITY OF PETROLEUM AND MINERALS, Dhahran (SA)

(*) Notice: Subject to any disclaimer, the term of this patent is extended or adjusted under 35 U.S.C. 154(b) by 0 days.

(21) Appl. No.: 18/982,787

(22) Filed: Dec. 16, 2024

Related U.S. Application Data

(60) Provisional application No. 63/684,488, filed on Aug. 19, 2024.

(51) Int. Cl.
  *E21B 43/267* (2006.01)
  *C09K 8/68* (2006.01)
  *C09K 8/80* (2006.01)

(52) U.S. Cl.
  CPC .............. *E21B 43/267* (2013.01); *C09K 8/68* (2013.01); *C09K 8/80* (2013.01)

(58) Field of Classification Search
  CPC ............ E21B 43/267; C09K 8/68; C09K 8/80
  See application file for complete search history.

(56) References Cited

U.S. PATENT DOCUMENTS

| | | |
|---|---|---|
| 6,435,277 B1 | 8/2002 | Qu et al. |
| 7,325,608 B2 | 2/2008 | van Batenburg et al. |
| 7,712,535 B2 | 5/2010 | Venditto et al. |
| 8,507,412 B2 | 8/2013 | Lukocs et al. |
| 10,077,396 B2 | 9/2018 | Nguyen et al. |
| 2009/0044942 A1* | 2/2009 | Gupta .................. C09K 8/5751 507/214 |

OTHER PUBLICATIONS

Duc H. Le, et al., "Removal of fracturing gel: A laboratory and modeling investigation accounting for viscous fingering channels", Journal of Petroleum Science and Engineering, vol. 88-89, Jun. 2012, pp. 145-155, 33 pages.

\* cited by examiner

*Primary Examiner* — Crystal J Lee
(74) *Attorney, Agent, or Firm* — Oblon, McClelland, Maier & Neustadt, L.L.P.

(57) ABSTRACT

A method of fracturing fluid recovery includes injecting a fracturing fluid into a subterranean reservoir via a wellbore. The fracturing fluid includes a carrier fluid, a proppant and an ionic liquid. The method further includes increasing a pressure within the wellbore to create or extend fractures in the subterranean reservoir, injecting the fracturing fluid into the fractures and recovering the fracturing fluid by allowing the fracturing fluid to flow back while leaving the proppant within the fractures.

17 Claims, 14 Drawing Sheets

FRACTURING FLUID RECOVERY WITH IONIC LIQUID

BACKGROUND

Technical Field

The present disclosure is directed towards fluid recovery techniques, and more particularly, towards fracturing fluid recovery from a subterranean reservoir via a wellbore.

Description of Related Art

The "background" description provided herein is for the purpose of generally presenting the context of the disclosure. Work of the presently named inventors, to the extent it is described in this background section, as well as aspects of the description which may not otherwise qualify as prior art at the time of filing, are neither expressly nor impliedly admitted as prior art against the present invention.

With the advance of civilization and industrialization, energy demands have increased exponentially. In order to meet the energy demands, fossil fuels have been a cornerstone for many decades. However, with increased exploitation of subterranean geological formations, the process of oil extraction has become more challenging. There are a plurality of methods that are employed to fracture a subterranean geological formation (reservoir), which is determined to be a rich crude oil resource through external evaluations. One such method is hydraulic fracturing, which is a process that requires the injection of substantial fluid volumes to increase the reservoir pressure until rock fracturing occurs. However, a significant portion of the injected fluid remains unrecovered, impeding hydrocarbon flow in the reservoir. The aforementioned issue is particularly challenging in unconventional reservoirs due to capillary forces that trap water within rock pores, hindering hydrocarbon recovery. Extensive research has been done and aimed to develop flowback additives that reduce surface and interfacial tension, facilitating water flowback into the wellbore.

Flowback additives in hydraulic fracturing are chemicals used to improve fluid recovery and prevent corrosion, scaling, and bacterial growth during flowback. The additives include surfactants to reduce surface tension, corrosion inhibitors to protect equipment, biocides to control bacteria, scale inhibitors to prevent scaling, pH adjusters to stabilize fluid pH, defoaming agents to reduce foam, flocculants to settle solids, and viscosity modifiers to adjust fluid thickness to enhance recovery and prevent issues. Reservoir surfactant technology may encounter several major challenges for use in well stimulation processes, including requirements to use nontoxic, environmentally acceptable surfactants that provide long-term stability at high temperature, pressure, and salinity during the hydraulic fracturing process and further provide relatively low concentration requirements to achieve acceptable performance. Presently, there have been several attempts to develop an environmentally friendly flowback additive to be included in the hydraulic fracturing fluid [Yue, Z. Peng, Y., He, K., and Xu, L., *Multifunctional fracturing additives as flowback aid, SPE Annual Technical Conference and Exhibition*, SPE-181383-MS, Dubai, UAE, September 2016].

Researchers have evaluated flowback additives in high-salinity brines used for drilling and workover, showing that effective additives maintain surface tension reduction properties, resulting in lower brine imbibition and increased water recovery [Zhang, H., Marinescu, P., and Foxenberg, W. *Unique flow-back chemistry for enhancing productivity of low-permeability reservoir, IADC/SPE Asia Pacific Drilling Technology Conference and Exhibition*, SPE-155505-MS, Tianjin, China, July 2012]. Further, research has also been done to discuss the use of different surfactants in "Huff-n-Puff" processes, suggesting that surfactants may gradually solubilize and mobilize oil droplets, leading to improved oil recovery, as supported by field data [Shuler, Patrick J, Lu, Zayne, Ma, *Qisheng and co-workers, Surfactant huff-n-puff application potentials for unconventional reservoirs, SPE Improved Oil Recovery Conference*, SPE-179667-MS, Tulsa, Oklahoma, USA, April 2016]. Furthermore, the limitations of relying solely on contact angle measurements to screen flowback materials is understood [Galindo, Tanhee and Rimassa, S. *Evaluation of environmentally acceptable surfactants for application as flowback aids, SPE International Symposium on Oilfield Chemistry*, SPE-164122-MS, The Woodlands, Texas, USA, April 2013].

Conventional flowback additives described above may exhibit reduced effectiveness under severe conditions, leading to decreased recovery rates and potential operational issues. Each of the aforementioned flowback additives (surfactants) suffers from one or more drawbacks such as, but not limited to, environmental toxicity, inability to deal with harsh subsurface conditions, like high salinity and high temperature, and high cost. The conventional additives may degrade over time, losing effectiveness in harsh conditions. Additionally, conventional additives may increase operational costs due to disposal, potential regulatory concerns, and handling challenges in sensitive environments.

Accordingly, one object of the present disclosure is to provide a method of fracturing fluid recovery using ionic liquids that may circumvent the drawbacks, such as, low sustainability, low environmental compatibility, low thermal stability, and water blockage, of the methods and materials known in the art.

SUMMARY

In an exemplary embodiment, a method of fracturing fluid recovery is described. The method includes injecting a fracturing fluid into a subterranean reservoir via a wellbore. The fracturing fluid includes a carrier fluid, a proppant and an ionic liquid. The method further includes increasing a pressure within the wellbore to create or extend fractures in the subterranean reservoir, injecting the fracturing fluid into the fractures and recovering the fracturing fluid by allowing the fracturing fluid to flow back while leaving the proppant within the fractures.

In some embodiments, the ionic liquid includes at least one selected from the group consisting of 1-butyl-3-methylimidazolium chloride, 1-hexyl-3-methylimidazolium chloride, and 1-decyl-3-methylimidazolium chloride.

In some embodiments, the ionic liquid includes 1-decyl-3-methylimidazolium chloride.

In some embodiments, the recovering has a fracturing fluid recovery volume percentage of 56% relative to a total volume of the fracturing fluid injected into the wellbore.

In some embodiments, the method further includes executing a drainage process by injecting a nitrogen gas into the formation to remove a portion of a formation fluid naturally present in the subterranean reservoir, where a regained gas permeability during the recovering is 25% higher than a gas permeability during the executing.

In some embodiments, the fracturing fluid has an interfacial tension of 1 milliNewtons per meter (mN/m) to 10 mN/m at a temperature of 25° C. to 90° C. when the ionic liquid has a concentration of 0.5 gallon per thousand units (gpt) to 1 gpt in the fracturing fluid.

In some embodiments, the fracturing fluid has a water contact angle of 25° to 65°.

In some embodiments, the fracturing fluid has a surface tension of about 35 mN/m when the ionic liquid has a concentration of 400 parts per million (ppm) to 1,400 ppm in the fracturing fluid.

In some embodiments, recovering includes reducing the pressure within the wellbore.

In some embodiments, the method further includes executing a drainage process by injecting a drainage gas into the formation to remove a portion of a formation fluid naturally present in the subterranean reservoir.

In some embodiments, the drainage gas includes nitrogen, methane, ethane or any combinations thereof.

In some embodiments, the subterranean reservoir includes a formation fluid that has a higher salinity than the fracturing fluid.

In some embodiments, the formation fluid has about 59,491 ppm of $Na^+$ based on a total weight of the formation fluid, and the fracturing fluid has about 18,414 ppm of $Na^+$ based on a total weight of the fracturing fluid.

In some embodiments, the subterranean reservoir includes a formation fluid including, based on a total weight of the formation fluid, 20,000 ppm to 90,000 ppm of $Na^+$, 0 ppm to 100 ppm of $K^+$, 10,000 ppm to 30,000 ppm of $Ca^{2+}$, 1,000 ppm to 4,000 ppm of $Mg^{2+}$, 100,000 ppm to 160,000 ppm of $Cl^-$, 50 ppm to 800 ppm of $SO_4^{2-}$, and 50 ppm to 800 ppm of $HCO_3^-$.

In some embodiments, the fracturing fluid includes, based on a total weight of the fracturing fluid, 10,000 ppm to 30,000 ppm of $Na^+$, 200 ppm to 900 ppm of $K^+$, 200 ppm to 900 ppm of $Ca^{2+}$, 1,000 ppm to 4,000 ppm of $Mg^{2+}$, 10,000 ppm to 60,000 ppm of $Cl^-$, 1,000 ppm to 6,000 ppm of $SO_4^{2-}$, and 0 ppm to 100 ppm of $HCO_3^-$.

In some embodiments, the ionic liquid has a concentration of 0.5 gpt to 1 gpt in the fracturing fluid.

In some embodiments, the ionic liquid has a concentration of 10 ppm to 700 ppm in the fracturing fluid.

In some embodiments, the fracturing fluid is injected into the wellbore at a temperature of 25° C. to 90° C.

In some embodiments, the subterranean reservoir has a solid phase including, based on a total weight of the solid phase, 50 weight percent (wt. %) to 80 wt. % of quartz, 10 wt. % to 20 wt. % of illite, 1 wt. % to 10 wt. % of potassium feldspar, and 10 wt. % to 25 wt. % of plagioclase.

In some embodiments, the solid phase includes Kentucky sandstones.

The foregoing general description of the illustrative embodiments and the following detailed description thereof are merely exemplary aspects of the teachings of this disclosure, and are not restrictive.

BRIEF DESCRIPTION OF THE DRAWINGS

A more complete appreciation of this disclosure and many of the attendant advantages thereof will be readily obtained as the same becomes better understood by reference to the following detailed description when considered in connection with the accompanying drawings.

DETAILED DESCRIPTION

Figure 1:
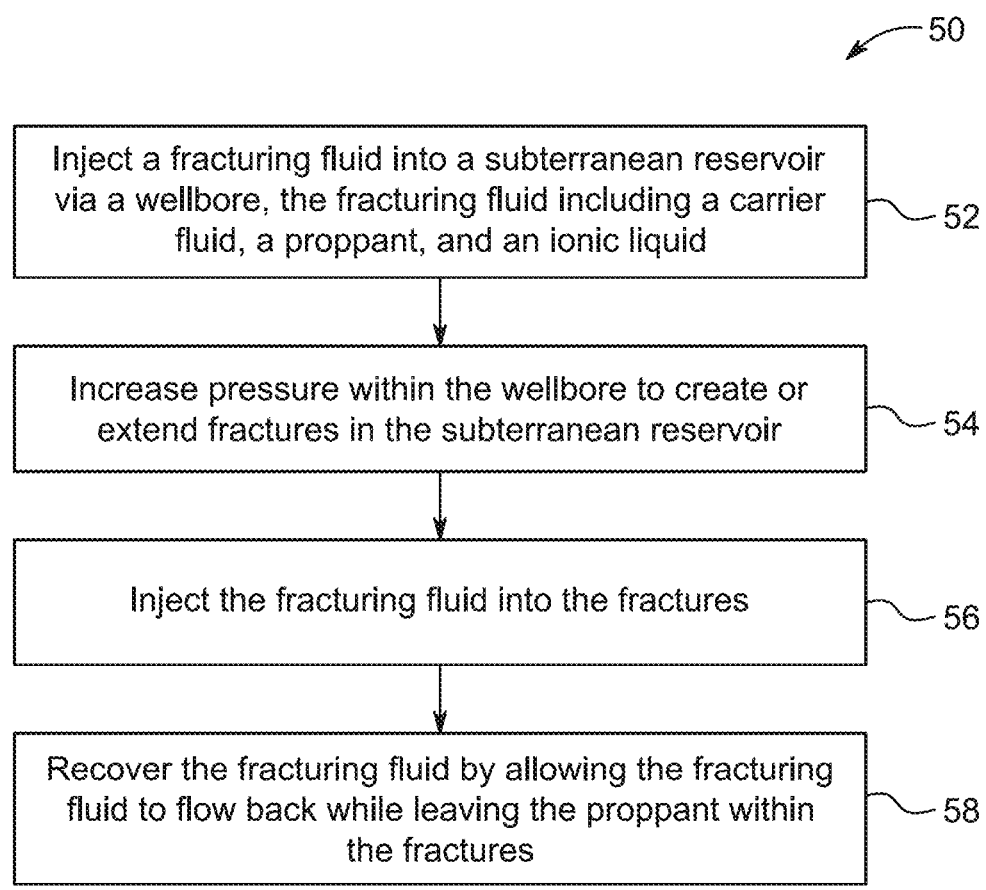
FIG. 1 is an exemplary flow chart of a method of fracturing fluid recovery, according to certain embodiments.

In the drawings, like reference numerals designate identical or corresponding parts throughout the several views. Further, as used herein, the words "a", "an" and the like generally carry a meaning of "one or more", unless stated otherwise.

Furthermore, the terms "approximately," "approximate", "about" and similar terms generally refer to ranges that include the identified value within a margin of 20%, 10%, or preferably 5%, and any values therebetween.

As used herein, the term "fracturing fluid recovery" refers to a process of retrieving a portion of the fracturing fluid injected into a subterranean formation during hydraulic fracturing operations. This process involves the flowback of fluids from the formation to the surface, which may include the original fracturing fluid, formation water, hydrocarbons, and other substances.

As used herein, the term "subterranean reservoir" refers to a subsurface geological formation that has the capacity to store fluids such as water, oil, gas, or other hydrocarbons. While it is not itself a process, it is often associated with processes such as fluid injection, extraction, and enhanced recovery techniques, including hydraulic fracturing, water flooding, or gas injection, to improve resource extraction. The term encompasses reservoirs composed of various rock types, such as sandstone, limestone, shale, or carbonate formations, and can be subject to processes to assess, manage, and utilize the reservoir's storage and flow properties.

As used herein, the term "wellbore" refers to a drilled hole or borehole that serves as the conduit for accessing a subterranean reservoir. While the term itself denotes the physical structure, it is often associated with processes such as drilling, completion, cementing, stimulation, and production. These processes enable the wellbore to facilitate the extraction or injection of fluids, such as oil, gas, water, or other substances, into or out of the reservoir. The wellbore is a critical element in processes like hydraulic fracturing, logging, and pressure testing to ensure desirable reservoir performance and resource recovery.

As used herein, the term "ionic liquid" refers to a salt in the liquid state at ambient conditions such as atmospheric pressure and room temperature of 20-25° C. An ionic liquid is largely or entirely made of ions. An ionic liquid typically includes organic cations and inorganic or organic anions or alternatively organic anions and inorganic or organic cations. An ionic liquid can exhibit unique properties such as low volatility, high thermal stability, and tunable solubility. Ionic liquids are utilized in various processes, including chemical synthesis, catalysis, extraction, and separation. Ionic liquids may also be known as liquid electrolytes, ionic melts, ionic fluids, fused salts, liquid salts, or ionic glasses in the art. In some embodiments, an ionic liquid can include a salt in the liquid state at atmospheric pressure and an elevated temperature of 25-100° C., especially when fracturing fluid recovery is performed at the elevated temperature. Nevertheless, ambient ionic liquids are preferred in the present disclosure.

Aspects of this disclosure pertain to a method of fracturing fluid recovery using an environmentally friendly flowback additive. The importance of this disclosure lies in its ability to enhance fracturing fluid recovery while reducing environmental impact by utilizing an innovative, eco-friendly flowback additive, promoting both operational efficiency and sustainability.

FIG. 1A illustrates a schematic flow chart of a method 50 of fracturing fluid recovery. The order in which the method 50 is described is not intended to be construed as a limitation, and any number of the described method steps can be combined to implement the method 50. Additionally, individual steps may be removed or skipped from the method 50 without departing from the spirit and scope of the present disclosure.

At step 52, the method 50 includes injecting a fracturing fluid into a subterranean reservoir via a wellbore. In the present disclosure, the fracturing fluid includes a carrier fluid, a proppant and an ionic liquid. In some embodiments, the ionic liquid may include, but is not limited to, 1-butyl-3-methylimidazolium chloride, 1-hexyl-3-methylimidazolium chloride, 1-decyl-3-methylimidazolium chloride, 1-ethyl-3-methylimidazolium bromide, 1-butyl-3-methylimidazolium bromide, 1-octyl-3-methylimidazolium chloride, 1-allyl-3-methylimidazolium chloride, 1-butyl-3-methylimidazolium tetrafluoroborate, 1-hexyl-3-methylimidazolium tetrafluoroborate, 1-ethyl-3-methylimidazolium acetate, 1-butyl-3-methylimidazolium acetate, 1-hexyl-3-methylimidazolium acetate, 1-ethyl-3-methylimidazolium methyl sulfate, 1-butyl-3-methylimidazolium methyl sulfate, 1-hexyl-3-methylimidazolium methyl sulfate, 1-butyl-3-methylimidazolium triflate, 1-hexyl-3-methylimidazolium triflate, 1-ethyl-3-methylimidazolium triflate, 1-butyl-2,3-dimethylimidazolium chloride, 1-octyl-2,3-dimethylimidazolium chloride, 1-ethyl-2,3-dimethylimidazolium chloride, 1-butyl-3-methylimidazolium hydrogen sulfate, 1-ethyl-3-methylimidazolium hydrogen sulfate, 1-hexyl-3-methylimidazolium hydrogen sulfate, 1-butyl-3-methylimidazolium bis(trifluoromethylsulfonyl)imide, 1-ethyl-3-methylimidazolium bis(trifluoromethylsulfonyl)imide, 1-hexyl-3-methylimidazolium bis(trifluoromethylsulfonyl)imide or any combinations thereof. In a preferred embodiment, the ionic liquid includes 1-butyl-3-methylimidazolium chloride, 1-hexyl-3-methylimidazolium chloride, 1-decyl-3-methylimidazolium chloride or any combinations thereof. In a preferred embodiment, the ionic liquid includes 1-decyl-3-methylimidazolium chloride.

In some embodiments, the concentration of the ionic liquid in the fracturing fluid may range from 0.1 gallon per thousand units (gpt) to 3.0 gpt e.g. 0.1 gpt, 0.2 gpt, 0.3 gpt, 0.5 gpt, 0.7 gpt, 0.8 gpt, 1.0 gpt, 1.5 gpt, 2.0 gpt, 2.5 gpt, 3.0 gpt or any values therebetween. In a preferred embodiment, the ionic liquid may have a concentration ranging from 0.5 to 1 gpt.

In some embodiments, the ionic liquid concentration in the fracturing fluid may range from 10 parts per million (ppm) to 1,000 ppm e.g. 10 ppm, 20 ppm, 50 ppm, 100 ppm, 200 ppm, 300 ppm, 500 ppm, 700 ppm, 800 ppm, 1000 ppm or any values therebetween. In a preferred embodiment, the ionic liquid may have a concentration of 300 ppm to 700 ppm.

In some embodiments, the fracturing liquid may optionally contain a surfactant at a concentration of 0-10 wt. %

(e.g. 0 wt. %, 0.1 wt. %, 0.5 wt. %, 1 wt. %, 2 wt. %, 5 wt. %, 7 wt. %, 8 wt. %, 10 wt. % or any values therebetween) relative to a total weight of the fracturing liquid. The surfactant includes, but is not limited to, cetrimonium bromide, sodium salicylate, dihydroxyl alkyl glycinate, alkyl ampho acetate or propionate, alkyl betaine, alkyl amidopropyl betaine, alkylamino mono- or di-propionates derived from waxes, fats or oils, or any combinations thereof. While some in the art may refer to an ionic liquid as a surfactant in a broad sense, it is noted that the term "surfactant" in the present disclosure does not include an ionic liquid. In some embodiments, the fracturing liquid includes an ionic liquid and no surfactant. In the aforementioned broad sense, the fracturing liquid includes no surfactant other than an ionic liquid.

The carrier fluid may include water, oil and/or any other base fluid, and the proppants may include silica sand, ceramic proppants, and/or resin-coated proppants. Silica sand is widely used and is inexpensive, abundant, and has a high conductivity rate. Ceramic proppants are more durable and have higher crush resistance than silica sand, making them more suitable for use in deep wells and high-stress formations. In a preferred embodiment, the carrier fluid is sea water.

In some embodiments, the fracturing fluid has an interfacial tension ranging from 1-20 mN/m, e.g. 1 mN/m, 2 mN/m, 3 mN/m, 5 mN/m, 7 mN/m, 8 mN/m, 10 mN/m, 12 mN/m, 13 mN/m, 15 mN/m, 17 mN/m, 18 mN/m, 20 mN/m or any values therebetween, at a temperature range of 25° C. to 90° C. when the ionic liquid concentration is between 0.5 and 1 gallon per thousand units (gpt). In a preferred embodiment, the fracturing fluid exhibits interfacial tensions of 14.5 mN/m, 14 mN/m, and 15 mN/m at temperatures of 50° C., 70° C., and 90° C., respectively when the ionic liquid concentration is 0.5 gpt.

The fracturing fluid has a surface tension of about 30-40 mN/m, preferably 33-37 mN/m, preferably 35 mN/m when the ionic liquid has a concentration of 400-1,400 parts per million (ppm) in the fracturing fluid.

In some embodiments, the fracturing fluid has a water contact angle ranging from 25° to 65°, including ranges such as 25-30°, 30-35°, 35-40°, 40-45°, 45-50°, 50-55°, 55-60°, 60-65°, 25-35°, 35-45°, 45-55°, 55-65°, 28-38°, 38-48°, 48-58°, 26-36°, 36-46°, 46-56°, 56-65°, and 30-50°. In a preferred embodiment, the fracturing fluid has a water contact angle of 45°.

In some embodiments, the subterranean reservoir includes a formation fluid that has a higher salinity than the fracturing fluid. In some embodiments, the subterranean reservoir includes a formation fluid with a $Na^+$ concentration ranging from 20,000 to 90,000 ppm, including ranges such as 20,000-25,000 ppm, 25,000-30,000 ppm, 30,000-35,000 ppm, 35,000-40,000 ppm, 40,000-45,000 ppm, 45,000-50,000 ppm, 50,000-55,000 ppm, 55,000-60,000 ppm, 60,000-65,000 ppm, 65,000-70,000 ppm, 70,000-75,000 ppm, 75,000-80,000 ppm, 80,000-85,000 ppm, 85,000-90,000 ppm, 20,000-30,000 ppm, 30,000-40,000 ppm, 40,000-50,000 ppm, 50,000-60,000 ppm, 60,000-70,000 ppm, and 70,000-80,000 ppm, based on a total weight of the formation fluid. The fracturing fluid includes a $Na^+$ concentration ranging from 10,000 to 30,000 ppm, including ranges such as 10,000-12,000 ppm, 12,000-14,000 ppm, 14,000-16,000 ppm, 16,000-18,000 ppm, 18,000-20,000 ppm, 20,000-22,000 ppm, 22,000-24,000 ppm, 24,000-26,000 ppm, 26,000-28,000 ppm, 28,000-30,000 ppm, 10,000-15,000 ppm, 15,000-20,000 ppm, 20,000-25,000 ppm, 25,000-30,000 ppm, 11,000-13,000 ppm, 13,000-15,000 ppm, 15,000-17,000 ppm, 17,000-19,000 ppm, 19,000-21,000 ppm, and 21,000-23,000 ppm, based on a total weight of the fracturing fluid. In a preferred embodiment, the formation fluid contains approximately 59,491 ppm of $Na^+$ based on the total weight of the formation fluid while the fracturing fluid contains about 18,414 ppm of $Na^+$, based on the total weight of the fracturing fluid.

In some embodiments, the formation fluid includes a $K^+$ concentration ranging from 0 to 100 ppm, including ranges such as 0-5 ppm, 5-10 ppm, 10-15 ppm, 15-20 ppm, 20-25 ppm, 25-30 ppm, 30-35 ppm, 35-40 ppm, 40-45 ppm, 45-50 ppm, 50-55 ppm, 55-60 ppm, 60-65 ppm, 65-70 ppm, 70-75 ppm, 75-80 ppm, 80-85 ppm, 85-90 ppm, 90-95 ppm, and 95-100 ppm, based on the total weight of the formation fluid. In a preferred embodiment, the formation fluid contains 0 ppm of $K^+$ based on the total weight of the formation fluid.

In some embodiments, the formation fluid includes a $Ca^{2+}$ concentration ranging from 10,000 to 30,000 ppm, including ranges e.g. 10,000 ppm, 11,000 ppm, 12,000 ppm, 15,000 ppm, 17,000 ppm, 18,000 ppm, 20,000 ppm, 22,000 ppm, 23,000 ppm, 25,000 ppm, 27,000 ppm, 28,000 ppm, 30,000 ppm or any values therebetween, based on the total weight of the formation fluid. In a preferred embodiment, the formation fluid contains 19,040 ppm of $Ca^{2+}$, based on the total weight of the formation fluid.

In some embodiments, the formation fluid includes a $Mg^{2+}$ concentration ranging from 1,000 to 4,000 ppm, including ranges such as 1,000-1,500 ppm, 1,500-2,000 ppm, 2,000-2,500 ppm, 2,500-3,000 ppm, 3,000-3,500 ppm, 3,500-4,000 ppm, 1,000-2,000 ppm, 2,000-3,000 ppm, 3,000-4,000 ppm, 1,200-1,700 ppm, 1,700-2,200 ppm, 2,200-2,700 ppm, 2,700-3,200 ppm, 3,200-3,700 ppm, 1,500-2,500 ppm, 2,500-3,500 ppm, 1,000-2,500 ppm, 2,500-3,000 ppm, 3,000-3,500 ppm, and 3,000-4,000 ppm, based on the total weight of the formation fluid. In a preferred embodiment, the formation fluid contains 2,439 ppm of $Mg^{2+}$, based on the total weight of the formation fluid.

In some embodiments, the formation fluid includes a $Cl^-$ concentration ranging from 100,000 to 160,000 ppm, including ranges such as 100,000-105,000 ppm, 105,000-110,000 ppm, 110,000-115,000 ppm, 115,000-120,000 ppm, 120,000-125,000 ppm, 125,000-130,000 ppm, 130,000-135,000 ppm, 135,000-140,000 ppm, 140,000-145,000 ppm, 145,000-150,000 ppm, 150,000-155,000 ppm, 155,000-160,000 ppm, 100,000-110,000 ppm, 110,000-120,000 ppm, 120,000-130,000 ppm, 130,000-140,000 ppm, 140,000-150,000 ppm, 150,000-160,000 ppm, 105,000-115,000 ppm, and 115,000-125,000 ppm, based on the total weight of the formation fluid. In a preferred embodiment, the formation fluid contains 132,060 ppm of $Cl^-$, based on the total weight of the formation fluid.

In some embodiments, the formation fluid includes a $SO_4^{2-}$ concentration ranging from 50 to 800 ppm, including ranges such as 50-100 ppm, 100-150 ppm, 150-200 ppm, 200-250 ppm, 250-300 ppm, 300-350 ppm, 350-400 ppm, 400-450 ppm, 450-500 ppm, 500-550 ppm, 550-600 ppm, 600-650 ppm, 650-700 ppm, 700-750 ppm, 750-800 ppm, 50-150 ppm, 150-250 ppm, 250-350 ppm, 350-450 ppm, and 450-550 ppm, based on the total weight of the formation fluid. In a preferred embodiment, the formation fluid contains 350 ppm of $SO_4^{2-}$, based on the total weight of the formation fluid.

In some embodiments, the formation fluid includes a $HCO_3^-$ concentration ranging from 50 to 800 ppm, including ranges such as 50-100 ppm, 100-150 ppm, 150-200 ppm, 200-250 ppm, 250-300 ppm, 300-350 ppm, 350-400 ppm, 400-450 ppm, 450-500 ppm, 500-550 ppm, 550-600 ppm, 600-650 ppm, 650-700 ppm, 700-750 ppm, 750-800 ppm, 50-150 ppm, 150-250 ppm, 250-350 ppm, 350-450 ppm, and 450-550 ppm, based on the total weight of the formation fluid. In a preferred embodiment, the formation fluid contains 354 ppm of $HCO_3^-$, based on the total weight of the formation fluid.

In some embodiments, the fracturing fluid includes a $Na^+$ concentration ranging from 10,000 to 30,000 ppm, including ranges such as 10,000-12,000 ppm, 12,000-14,000 ppm, 14,000-16,000 ppm, 16,000-18,000 ppm, 18,000-20,000 ppm, 20,000-22,000 ppm, 22,000-24,000 ppm, 24,000-26,000 ppm, 26,000-28,000 ppm, 28,000-30,000 ppm, 10,000-15,000 ppm, 15,000-20,000 ppm, 20,000-25,000 ppm, 25,000-30,000 ppm, 11,000-13,000 ppm, 13,000-15,000 ppm, 15,000-17,000 ppm, 17,000-19,000 ppm, 19,000-21,000 ppm, and 21,000-23,000 ppm, based on a total weight of the fracturing fluid. In a preferred embodiment, the fracturing fluid contains about 18,414 ppm of $Na^+$, based on the total weight of the fracturing fluid.

In some embodiments, the fracturing fluid includes a $K^+$ concentration ranging from 200 to 900 ppm, including ranges such as 200-250 ppm, 250-300 ppm, 300-350 ppm, 350-400 ppm, 400-450 ppm, 450-500 ppm, 500-550 ppm, 550-600 ppm, 600-650 ppm, 650-700 ppm, 700-750 ppm, 750-800 ppm, 800-850 ppm, 850-900 ppm, 200-300 ppm, 300-400 ppm, 400-500 ppm, 500-600 ppm, 600-700 ppm, 700-800 ppm based on a total weight of the fracturing fluid. In a preferred embodiment, the fracturing fluid contains 577 ppm of $K^+$, based on the total weight of the fracturing fluid.

In some embodiments, the fracturing fluid includes a $Ca^{2+}$ concentration ranging from 200 to 900 ppm, including ranges such as 200-250 ppm, 250-300 ppm, 300-350 ppm, 350-400 ppm, 400-450 ppm, 450-500 ppm, 500-550 ppm, 550-600 ppm, 600-650 ppm, 650-700 ppm, 700-750 ppm, 750-800 ppm, 800-850 ppm, 850-900 ppm, 200-300 ppm, 300-400 ppm, 400-500 ppm, 500-600 ppm, 600-700 ppm, 700-800 ppm based on the total weight of the fracturing fluid. In a preferred embodiment, the fracturing fluid contains 577 ppm of $Ca^{2+}$, based on the total weight of the fracturing fluid.

In some embodiments, the fracturing fluid includes a $Mg^{2+}$ concentration ranging from 1,000 to 4,000 ppm, including ranges such as 1,000-1,200 ppm, 1,200-1,400 ppm, 1,400-1,600 ppm, 1,600-1,800 ppm, 1,800-2,000 ppm, 2,000-2,200 ppm, 2,200-2,400 ppm, 2,400-2,600 ppm, 2,600-2,800 ppm, 2,800-3,000 ppm, 3,000-3,200 ppm, 3,200-3,400 ppm, 3,400-3,600 ppm, 3,600-3,800 ppm, 3,800-4,000 ppm, 1,000-1,500 ppm, 1,500-2,000 ppm, 2,000-2,500 ppm, 2,500-3,000 ppm, and 3,000-3,500 ppm, based on the total weight of the fracturing fluid. In a preferred embodiment, the fracturing fluid contains 2,040 ppm of $Mg^{2+}$, based on the total weight of the fracturing fluid.

In some embodiments, the fracturing fluid includes a $Cl^-$ concentration ranging from 10,000 to 60,000 ppm, including ranges such as 10,000-15,000 ppm, 15,000-20,000 ppm, 20,000-25,000 ppm, 25,000-30,000 ppm, 30,000-35,000 ppm, 35,000-40,000 ppm, 40,000-45,000 ppm, 45,000-50,000 ppm, 50,000-55,000 ppm, 55,000-60,000 ppm, 10,000-20,000 ppm, 20,000-30,000 ppm, 30,000-40,000 ppm, 40,000-50,000 ppm, 50,000-60,000 ppm, 10,000-25,000 ppm, 15,000-30,000 ppm, 20,000-40,000 ppm, 25,000-50,000 ppm, and 30,000-60,000 ppm, based on the total weight of the fracturing fluid. In a preferred embodiment, the fracturing fluid contains 32,031 ppm of $Cl^-$, based on the total weight of the fracturing fluid.

In some embodiments, the fracturing fluid includes a $SO_4^{2-}$ concentration of 1,000-6,000 ppm, including ranges such as 1,000-1,500 ppm, 1,500-2,000 ppm, 2,000-2,500 ppm, 2,500-3,000 ppm, 3,000-3,500 ppm, 3,500-4,000 ppm, 4,000-4,500 ppm, 4,500-5,000 ppm, 5,000-5,500 ppm, 5,500-6,000 ppm, 1,000-2,000 ppm, 2,000-3,000 ppm, 3,000-4,000 ppm, 4,000-5,000 ppm, 5,000-6,000 ppm, 1,000-2,500 ppm, 2,500-3,500 ppm, 3,500-4,500 ppm, 4,500-5,500 ppm, 5,000-6,000 ppm, based on the total weight of the fracturing fluid. In a preferred embodiment, the fracturing fluid includes 5,206 ppm of $SO_4^{2-}$, based on the total weight of the fracturing fluid.

In some embodiments, the fracturing fluid includes a $HCO_3^-$ concentration of 0-100 ppm, including ranges such as 0-5 ppm, 5-10 ppm, 10-15 ppm, 15-20 ppm, 20-25 ppm, 25-30 ppm, 30-35 ppm, 35-40 ppm, 40-45 ppm, 45-50 ppm, 50-55 ppm, 55-60 ppm, 60-65 ppm, 65-70 ppm, 70-75 ppm, 75-80 ppm, 80-85 ppm, 85-90 ppm, 90-95 ppm, and 95-100 ppm, based on the total weight of the fracturing fluid. In a preferred embodiment, the fracturing fluid includes 0 ppm of $HCO_3^-$, based on the total weight of the fracturing fluid.

In some embodiments, the subterranean reservoir has a solid phase that includes quartz in an amount ranging from 50 to 80 wt. %, including ranges such as 50-55 wt. %, 55-60 wt. %, 60-65 wt. %, 65-70 wt. %, 70-75 wt. %, 75-80 wt. %, 50-60 wt. %, 60-70 wt. %, 70-80 wt. %, 55-65 wt. %, 60-75 wt. %, 50-65 wt. %, 55-70 wt. %, 60-80 wt. %, 50-70 wt. %, 55-80 wt. %, 50-75 wt. %, 55-60 wt. %, 60-65 wt. %, 65-80 wt. %, based on a total weight of the solid phase. In a preferred embodiment, the solid phase includes 66 wt. % of quartz, based on the total weight of the solid phase.

In some embodiments, the solid phase includes illite in an amount ranging from 10 to 20 wt. %, including ranges such as 10-12 wt. %, 12-14 wt. %, 14-16 wt. %, 16-18 wt. %, 18-20 wt. %, 10-15 wt. %, 12-16 wt. %, 14-18 wt. %, 16-20 wt. %, 10-13 wt. %, 13-16 wt. %, 13-18 wt. %, 11-14 wt. %, 14-17 wt. %, 15-18 wt. %, 11-16 wt. %, 12-17 wt. %, 15-20 wt. %, 10-18 wt. %, 14-20 wt. %, based on the total weight of the solid phase. In a preferred embodiment, the solid phase includes 14 wt. % of illite, based on the total weight of the solid phase.

In some embodiments, the solid phase includes potassium feldspar in an amount ranging from 1 to 10 wt. %, including ranges such as 1-2 wt. %, 2-3 wt. %, 3-4 wt. %, 4-5 wt. %, 5-6 wt. %, 6-7 wt. %, 7-8 wt. %, 8-9 wt. %, 9-10 wt. %, 1-3 wt. %, 3-5 wt. %, 5-7 wt. %, 7-9 wt. %, 1-4 wt. %, 4-7 wt. %, 7-10 wt. %, 2-5 wt. %, 5-8 wt. %, 2-6 wt. %, and 6-10 wt. % based on the total weight of the solid phase. In a preferred embodiment, the solid phase of the subterranean reservoir includes 3 wt. % of potassium feldspar, based on the total weight of the solid phase.

In some embodiments, the solid phase includes plagioclase in an amount ranging from 10 to 25 wt. %, including ranges such as 10-12 wt. %, 12-14 wt. %, 14-16 wt. %, 16-18 wt. %, 18-20 wt. %, 20-22 wt. %, 22-25 wt. %, 10-15 wt. %, 15-20 wt. %, 20-25 wt. %, 11-14 wt. %, 14-17 wt. %, 17-20 wt. %, 13-18 wt. %, 18-23 wt. %, 10-20 wt. %, 15-25 wt. %, 12-16 wt. %, 16-21 wt. %, and 21-25 wt. %, based on the total weight of the solid phase. In a preferred embodiment, the solid phase of the subterranean reservoir includes 17 wt. % of plagioclase, based on the total weight of the solid phase.

In some embodiments, the solid phase may include, but is not limited to, quartz, feldspar, mica, calcite, dolomite, gypsum, anhydrite, halite, clay minerals, kaolinite, illite, montmorillonite, smectite, chlorite, pyrite, hematite, magnetite, goethite, siderite, zircon, rutile, apatite, garnet, tourmaline, muscovite, biotite, orthoclase, plagioclase, amphiboles, pyroxenes, and olivine. In a preferred embodiment, the solid phase includes quartz, illite, potassium feldspar and plagioclase. In a preferred embodiment, the solid phase includes Kentucky sandstones.

In some embodiments, the fracturing fluid is injected into the wellbore at a temperature that may range from 25° C. to 90° C., including ranges such as 25-30° C., 30-35° C., 35-40° C., 40-45° C., 45-50° C., 50-55° C., 55-60° C., 60-65° C., 65-70° C., 70-75° C., 75-80° C., 80-85° C., 85-90° C., 28-33° C., 37-42° C., 42-47° C., 52-57° C., 62-67° C., 72-77° C., and 82-87° C. In a preferred embodiment, the fracturing fluid is injected into the wellbore at a temperature of about 90° C. At step 54, the method 50 includes increasing a pressure within the wellbore to create or extend fractures in the subterranean reservoir. Increasing the pressure may create or extend fractures in the subterranean reservoir. Fractures in a subterranean reservoir refer to cracks or fissures in the underground rock formations that can either naturally exist or be artificially induced to enhance fluid flow.

At step 56, the method 50 includes injecting the fracturing fluid into the fractures. The method of injecting the fracturing fluid into the fractures may happen in a single stage or in multiple stages.

At step 58, the method 50 includes recovering the fracturing fluid by allowing the fracturing fluid to flow back while leaving the proppant within the fractures. In an embodiment, the recovering the fracturing fluid includes executing a drainage process by injecting a nitrogen gas and/or any other drainage gas, into the formation to remove a portion of a formation fluid naturally present in the subterranean reservoir. In some embodiments, the drainage gas may include, but is not limited to, nitrogen, carbon dioxide, methane, ethane, propane, butane, hydrogen, oxygen, argon, helium, radon, or any combinations thereof. In a preferred embodiment, the drainage gas includes nitrogen, carbon dioxide, argon, helium, water vapor or any combinations thereof. In a preferred embodiment, the drainage gas includes nitrogen. Removing at least a portion of the formation fluid can reduce blockages, which often impede gas flow, in the pore spaces and fracture networks, therefore enhancing the natural gas permeability in the reservoir. In an embodiment, the regained gas permeability during the recovering is about 25% higher than a gas permeability during execution of the drainage process. In an embodiment, the recovering the fracturing fluid includes reducing the pressure within the wellbore. The method 50 can result in a fracturing fluid recovery volume percentage of 56% relative to a total volume of the fracturing fluid injected into the wellbore.

EXAMPLES

The following examples demonstrate a fracturing fluid as described herein. The examples are provided solely for illustration and are not to be construed as limitations of the present disclosure, as many variations thereof are possible without departing from the spirit and scope of the present disclosure.

Example 1: Materials

According to the present disclosure, a plurality of salts were used to prepare the solutions representing formation fluids and fracture fluids. Table 1 lists the salt compositions for the formation brine and the fracture fluid. All salts utilized in preparing brine solutions were of ACS grade and sourced from Sigma Aldrich. To simulate natural gas flow, nitrogen ($N_2$) gas was chosen. For interfacial tension measurements, light crude oil was used. Different methylimidazolium chloride ionic liquids were evaluated as flowback additives. Table 2 summarizes the chemical structure of the used ionic liquids with different carbon chain lengths. Kentucky sandstone cores with permeability of 0.1 millidarcy (md) were used in the core flood experiments. Table 3 summarizes the X-ray diffraction (XRD) analysis for the core samples. The cores had a diameter of about 1.5 inches and a length of about 3 inches.

TABLE 1

The salt compositions for the formation brine and the fracture fluid

| Ionic Species (provided) | Formation brine, ppm | Fracture base fluid, ppm |
| --- | --- | --- |
| $Na^+$ | 59,491 | 18,414 |
| $K^+$ | 0 | 577 |
| $Ca^{2+}$ | 19,040 | 577 |
| $Mg^{2+}$ | 2,439 | 2,040 |
| $Cl^-$ | 1,32,060 | 32,031 |
| $SO_4^{2-}$ | 350 | 5,206 |
| $HCO_3^-$ | 354 | |
| TDS | 2,13,734 | 58,857 |

TABLE 2

Chemical structure of the ionic liquids used in the disclosure

| 1-Butyl-3-methylimidazolium chloride | 1-Hexyl-3-methylimidazolium chloride | 1-Decyl-3-methylimidazolium chloride |
| --- | --- | --- |
| $C_8H_{15}ClN_2$ | $C_{10}H_{19}ClN_2$ | $C_{14}H_{27}ClN_2$ |

TABLE 3

Mineral composition of Kentucky sandstone cores used in the disclosure

| Mineral | Quartz | Illite | K-Feldspar | Plagioclase |
|---------|--------|--------|------------|-------------|
| Wt. %   | 66     | 14     | 3          | 17          |

Example 2: Ionic Liquids

Figure 2:
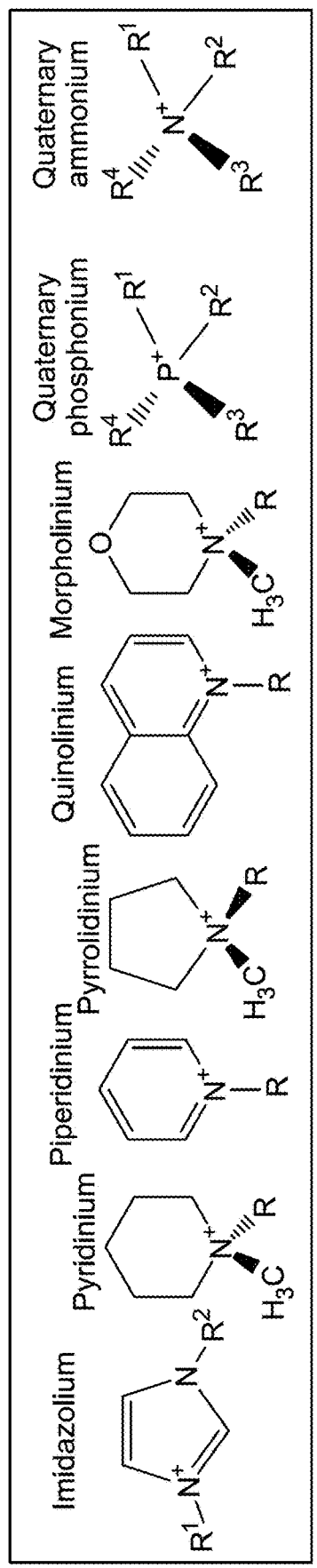
FIG. 2 is an exemplary structure of a plurality of cations used to make ionic liquids according to certain embodiments.
Figure 3:
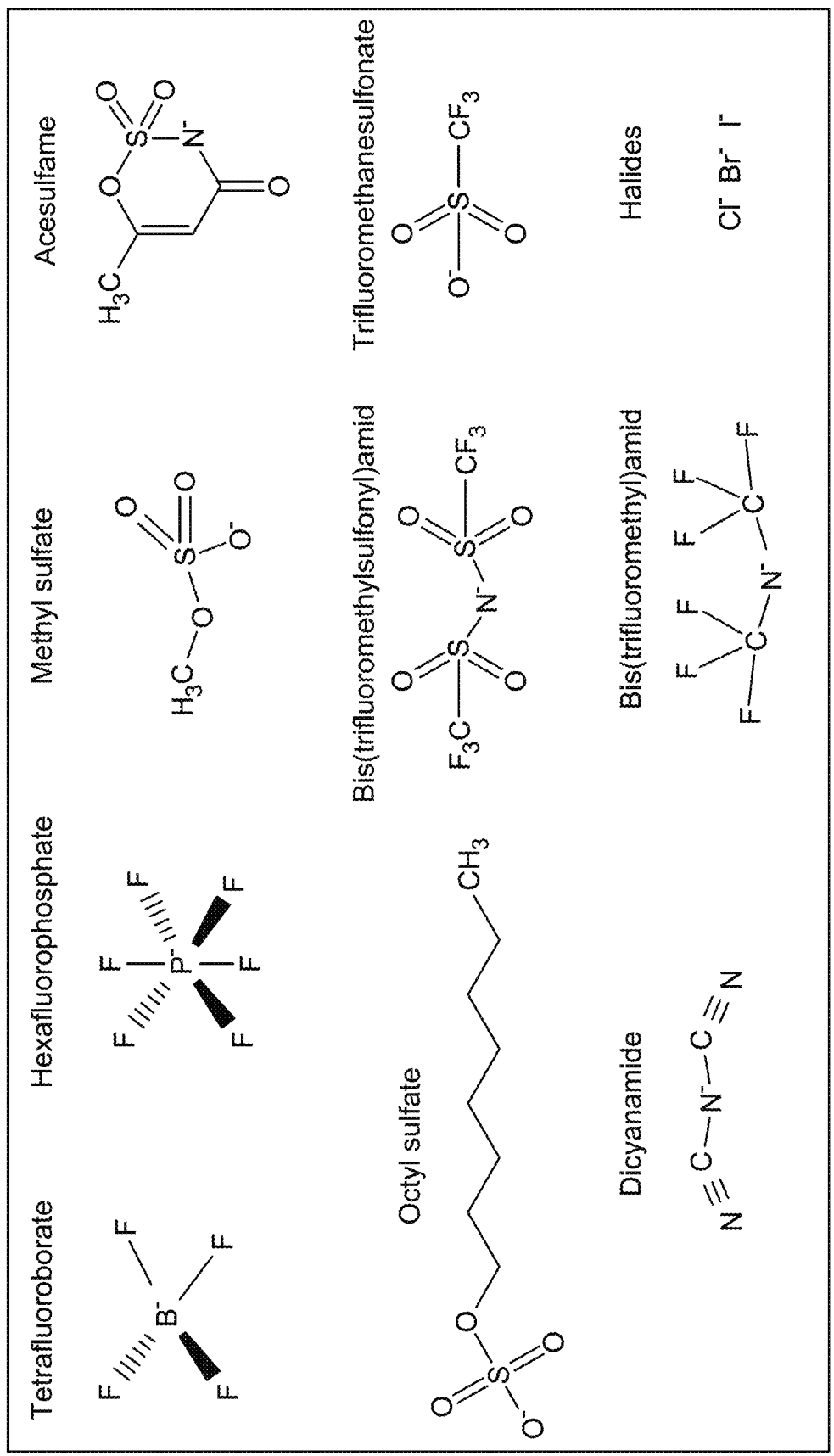
FIG. 3 is an exemplary structure of a plurality of anions used to make ionic liquids according to certain embodiments.

In general, ambient-temperature liquid salts known as ionic liquids are liquids at room temperature consisting solely of ions. Ionic liquids can be synthesized by combining various organic cations and anions, for example as shown in FIG. 2 and FIG. 3. Organic cation ionic liquids include, but are not limited to, quaternary ammonium, phosphonium, pyridinium, and imidazolium salts. Ionic liquids are typically characterized by a low melting point of less than 100° C., high viscosity, low vapor pressure, low toxicity, high polarity, good thermal stability, and chemical stability, compared with salts having a high melting point of 100° C. or more. Further, ionic liquids can be categorized into eleven classes by their properties including, neutral, acidic, basic, functionalized, protic, chiral, supported, bio-ionic, polymerized, energetic ionic liquids, and those featuring amphoteric anions [Hajipour, A. R., and Rafiee, F. *Recent progress in ionic liquids and their applications in organic synthesis, Org. Prep. Proced. Int.* 47 (4): 249-308]. The applications of ionic liquids in different fields and recent advancements in synthesis techniques have been explored [Bera, A., and Belhaj, H. *Ionic liquids as alternatives of surfactants in enhanced oil recovery, a state-of-the-art review, Journal of Molecular Liquids* 224:177-188; Vekariya, R. L. *A review of ionic liquids: Applications towards catalytic organic transformations, Journal of Molecular Liquids* 227:44-60; Nasirpour, N., Mohammadpourfard, M., and Heris, S. *Ionic liquids: Promising compounds for sustainable chemical processes and applications, Chemical Engineering Research and Design* 160:264-300; Atilhan, M., and Aparicio, S. *Review on chemical enhanced oil recovery: utilization of ionic liquids and deep eutectic solvents, Journal of Petroleum Science and Engineering,* 2021, 205, 108746; Hussain, S., Adewunmi, A., Alade, O., Murtaza M, and other co-workers. *A review of ionic liquids: Recent synthetic advances and oilfield applications, Journal of the Taiwan Institute of Chemical Engineers* 153:105195; Alade, O., Mohammed, I., Abdel-Azeim, Hussain, and other co-workers. *Review on applications of ionic liquids (ils) for bitumen recovery: mechanisms, challenges, and perspectives, Energy & Fuels* 37 (13): 8718-8738; Rahim, A., Yunus, N., and Bustam, M. *Ionic liquids hybridization for carbon dioxide capture: a review,* and, Song, F., Zhou, J., Jia, Z., He, L., Sui, H., and Li, X. *Interfacial behaviors of ionic liquids in petroleum production: a review, Journal of Molecular Liquids* 382:121864]. Furthermore, the desirable interfacial activity of ionic liquids at the oil-water interface arises from their unique molecular structure. Ionic liquids can consist entirely of ions, therefore, ionic liquids have both hydrophobic and hydrophilic components within a single molecule. The amphiphilic nature enables ionic liquids to strongly adsorb and orient themselves at the hydrocarbon/water interface due to the affinity of their charged components to each phase. The ability of ionic liquids to form a stable and robust interfacial layer stems from the arrangement of ions at the interface, creating a barrier that reduces interfacial tension between oil and water. Additionally, the tunability of ionic liquids, achieved by altering their cation or anion components, allows for customization of their interfacial properties, making them highly effective in various applications such as ionic liquids-assisted EOR, demulsification, and other processes where manipulating the oil-water interface is crucial [Sakthivel, S., Velusamy, S., Nair, V., Sharma, T., and Sangwai, J. *Interfacial tension of crude oil-water system with imidazolium and lactam-based ionic liquids and their evaluation for enhanced oil recovery under high saline environment, Fuel* 191:239-250; Song, F., Zhou, J., Jia, Z., He, L., Sui, H., and Li, X. *Interfacial behaviors of ionic liquids in petroleum production: a review. journal of molecular liquids, Journal of Molecular Liquids* 382: 121864]. The quick adsorption and spread of ionic liquids cations at the hydrocarbon/water interface was behind the reduction of the dynamic IFT between toluene and water from 36.3 millinewtons per meter (mN/m) to 12.8 mN/m [Jia, Z. Niu, Z. Yang, Z., Li, X. and other co-workers. *Interfacial behaviors of ionic liquid cations and asphaltenes at oil-water interface: dynamic diffusion and interfacially competitive adsorption, Energy&Fuels* 34:1259-1267]. Additionally, ionic liquids may perform better in the presence of divalent ions [Lashkarbolooki, M., and Ayatollahi, S. *Investigation of ionic liquids based on pyridinium and imidazolium as interfacial tension reducer of crude oil-water and their synergism with $MgCl_2$, J of Pet Sci & Eng* 171:414-421].

Example 3: Critical Micelle Concentration (CMC) Determination and Surface Tension Analysis The evaluation of the CMC for various chemicals was conducted using surface tension measurements. A selection of different chemicals may undergo screening to assess their effectiveness in reducing surface tension. Estimation of the CMC concentration was carried out to obtain the ideal concentration of the chemical. The KRUSS K100 tensiometer was used for measuring the surface tension of chemicals, including CMC.

Example 4: Interfacial Tension (IFT)

The interfacial tension and wettability were measured in order to explore the influence of flowback additives on the wettability characteristics of tight rock formations and the interfacial tension between the hydraulic fracturing fluid and the hydrocarbon fluids within the formation. The KRUSS spinning drop tensiometer was utilized to measure IFT. According to the present disclosure, IFT was measured at different temperature values up to 90° C.

Example 5: Wettability Measurements

The assessment of the impact of ionic liquids on rock wettability was conducted through contact angle measurements using the sessile drop method and a drop shape analyzer. Wettability measurements were conducted to probe how ionic liquids influence rock wettability. The contact angle measurement was conducted on pure quartz slides pretreated with the formation brine. Two different quartz samples were first pretreated in the formation brine to mimic the initial conditions of the formation behavior. The first sample was used to test the wettability behavior of the fracturing fluid droplet on the rock surface without the presence of ionic liquids. The same experiment was repeated on the second sample with fracturing fluid droplet including ionic liquid as a flowback additive.

Example 6: Regain Permeability Measurements

Figure 4:
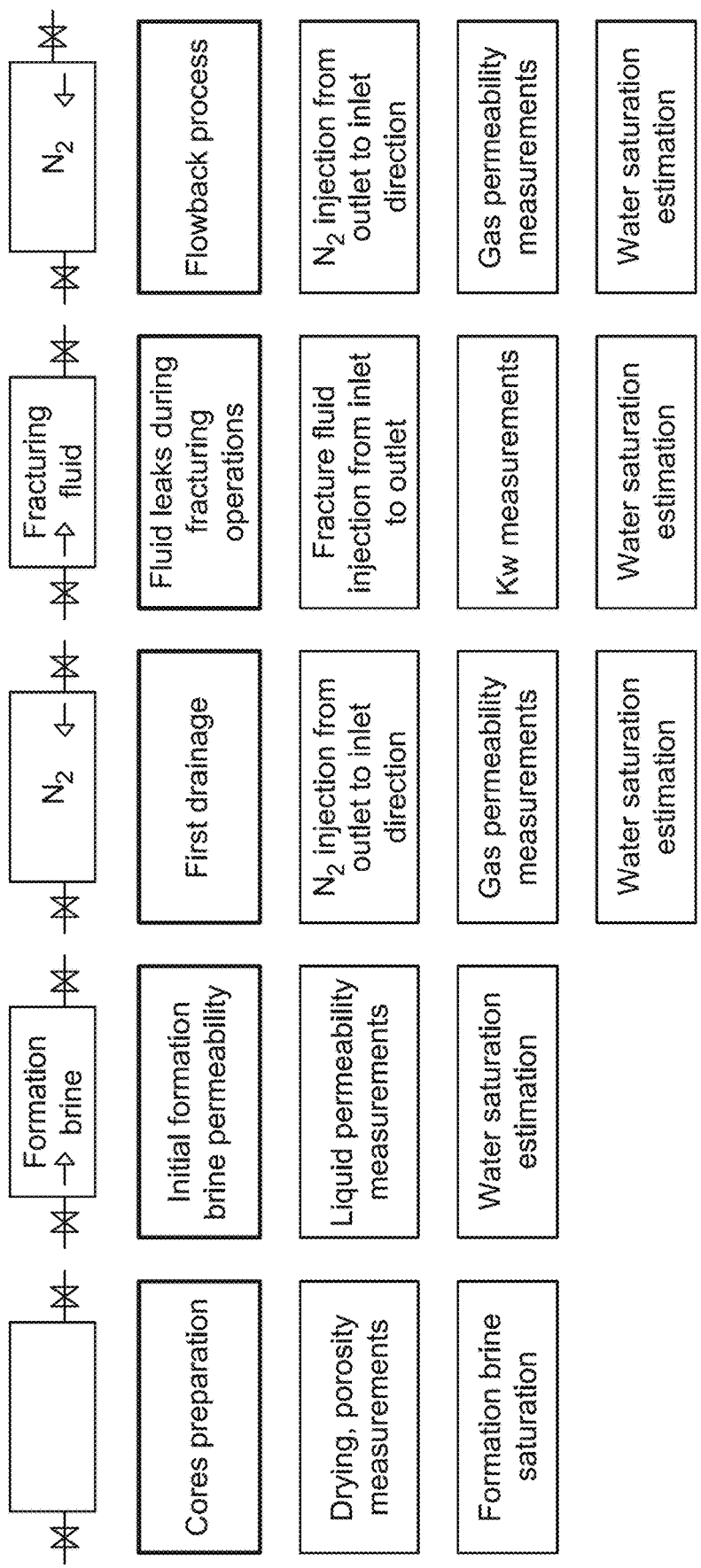
FIG. 4 is a schematic illustration of an exemplary core flood workflow procedure, conducted to test a regain permeability and a flowback recovery, according to certain embodiments.

Two sets of core flood experiments were performed in tight Kentucky sandstone cores with a permeability of 0.1 md, in order to evaluate the effectiveness of flowback additives in regaining the formation permeability after the hydraulic fracturing process. FIG. 4 summarizes the core flood process used to evaluate the performance of the ionic liquids to regain the hydrocarbon permeability and unloading the facture fluids. The cores were dried at 90° C., the dry weight was estimated, and the porosity of the cores was estimated with gas porosimeter. The cores were saturated under vacuum with the formation brine thereafter. The initial permeability of the cores was calculated through core flood with formation brine injection at 0.5 cubic centimeter per minute (cm³/min) until stabilized pressure conditions were obtained. The saturated weight was estimated to calculate the porosity of the cores thereafter. In addition to nuclear magnetic resonance (NMR), T2 was measured to estimate the water volume and distribution inside the cores. Further, first drainage step was followed where the $N_2$ was injected from the outlet to the inlet direction at 5 cm³/min until pressure stabilization was achieved and no more water production occurred. The irreducible water saturation ($S_{w\_irr1}$) was estimated through the volumetric method as a function of the core weight and further validated with NMR measurements. In addition, the initial effective gas permeability ($K_{g1}$) was calculated at the irreducible water saturation. In order to mimic the fracturing fluid leaks to the formation during the fracturing process, the fracture fluid was injected into the cores from the inlet to the outlet direction until pressure stabilization is achieved. Similarly, the water saturation was estimated through the volumetric calculations and validated with the NMR measurements. The effective water permeability at the residual gas saturation was calculated. The final step was the blowback process, where the $N_2$ was injected in the reverse direction similar to the first drainage process until pressure stabilization and no more water production was observed. The irreducible water was estimated ($S_{w\_irr2}$) thereafter and the final effective gas permeability ($K_{g2}$) was calculated. The regain percentage in the gas permeability was calculated as follows, Regain percentage in gas permeability=$(K_{g2}-K_{g1})/K_{g1}$ In addition, the percentage of flowback recovery was calculated as a function of the irreducible water saturation after the $N_2$ injection stages.

Results

The surface tension measurements were conducted using two different brine solutions to examine the impact of salinity type and composition on the behavior of ionic liquids. 5 weight percent (wt. %) KCl brine was first tested, and further, the results were compared with the fracture fluid base as highlighted in Table 1. Particularly, X1, X2 and X3 respectively represent 1-butyl-3-methylimidazolium chloride, 1-hexyl-3-methylimidazolium chloride and 1-decyl-3-methylimidazolium chloride in the present disclosure.

Figure 5:
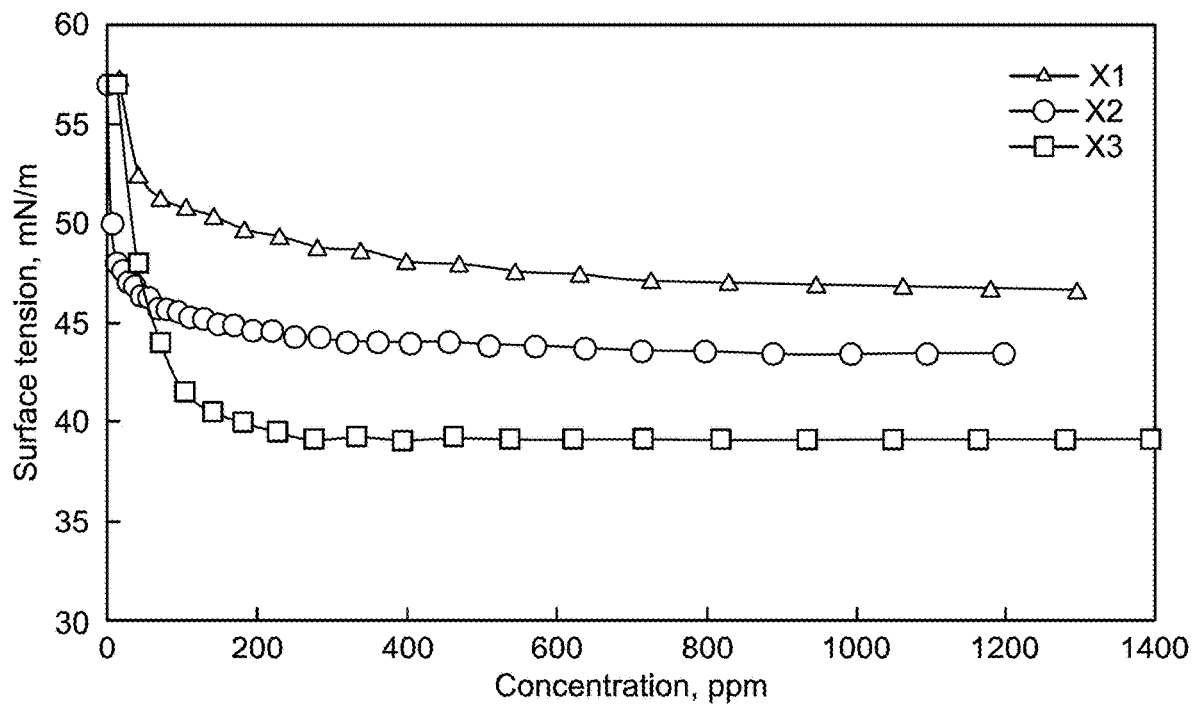
FIG. 5 is a graph depicting surface tension as a function of ionic liquid concentrations for three different ionic liquids, in 5 weight percent (wt. %) potassium chloride (KCl), according to certain embodiments.

FIG. 5 illustrates the relationship between surface tension and the concentration of three different ionic liquids prepared in 5 wt. % KCl brine. As the concentration of the ionic liquids increases, there is a notable decrease in surface tension until it reaches a stabilized value corresponding to CMC. Furthermore, FIG. 5 also demonstrates the impact of varying carbon chain lengths of the ionic liquids. Specifically, it shows that as the carbon chain length increases from ionic liquid X1 to X3, there is a significant reduction in surface tension. The stabilized surface tension values are observed to be 47 mN/m for X1, 44 mN/m for X2, and 39 mN/m for X3.

The CMC values exhibit a noticeable decrease concomitant with the incremental carbon chain length of the ionic liquids under investigation. In particular, the CMC values are quantified at 700 ppm for X1, 500 ppm for X2, and 300 ppm for X3. The elucidation underscores the relationship between the concentration of ionic liquids, the extension of carbon chains, and the consequential impact on surface tension and CMC values. The measurements provide substantive insights into the nuanced behavior of the compounds. The observed reduction in CMC values with an augmented carbon chain length implies an enhanced efficacy of ionic liquids with longer carbon chains in mitigating surface tension. Further, analytical revelation holds notable significance, offering a deeper understanding of how molecular attributes, particularly carbon chain length, affect the capacity of the substances to form micelles and influence surface tension. Such insights bear relevance to diverse applications, particularly those wherein the modulation of surface tension is of importance, such as in industrial processes or environmental assessments.

Figure 6:
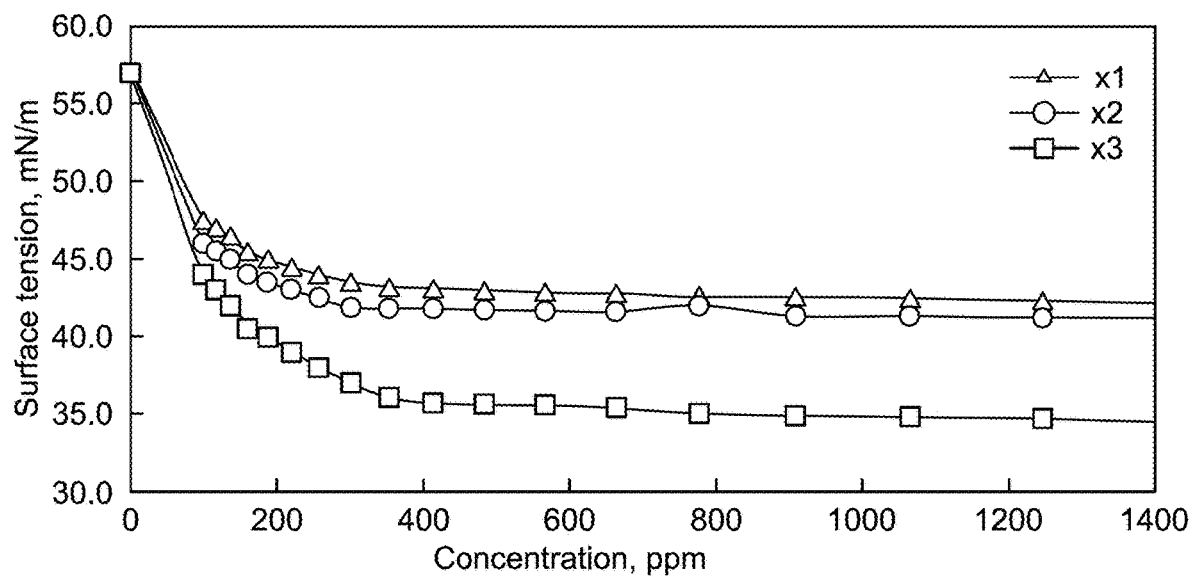
FIG. 6 is a graph depicting surface tension as a function of ionic liquid concentrations for the three different ionic liquids in a fracturing fluid base, according to certain embodiments.

FIG. 6 presents surface tension as a function of ionic liquid concentrations for these three ionic liquids, specifically focusing on performance of ionic liquids in a fracturing fluid base. The figure is similar to FIG. 5 but within the context of ionic liquids used in the fracturing fluid, aiming to evaluate how different ions impact the behavior of the ionic liquids. Similarly, the effect of the carbon chain length on the behavior of the ionic liquids remains consistent. As the chain length increases, there is a noticeable reduction in surface tension values. In this context, the stabilized surface tension values were recorded at 42.5 mN/m for X1, 41.3 mN/m for X2, and 35 mN/m for X3.

Based on surface tension measurements, X3 showed the highest performance and lower surface tension values with lower CMC values. Hence, the rest of the experimental investigation was focused on X3.

Figure 7:
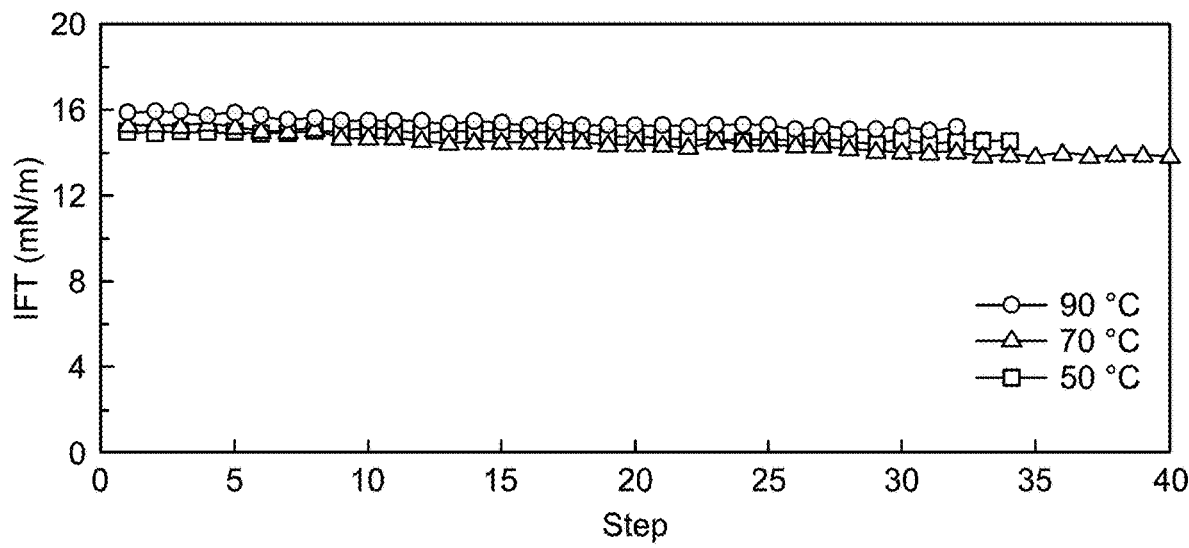
FIG. 7 shows spin drop tensiometer interfacial tension (IFT) results for X3 at 0.5 gallons per thousand units (GPT) in 5 wt. % KCl, at different temperatures with a spinning speed of 10000 revolutions per minute (rpm), according to certain embodiments.
Figure 8:
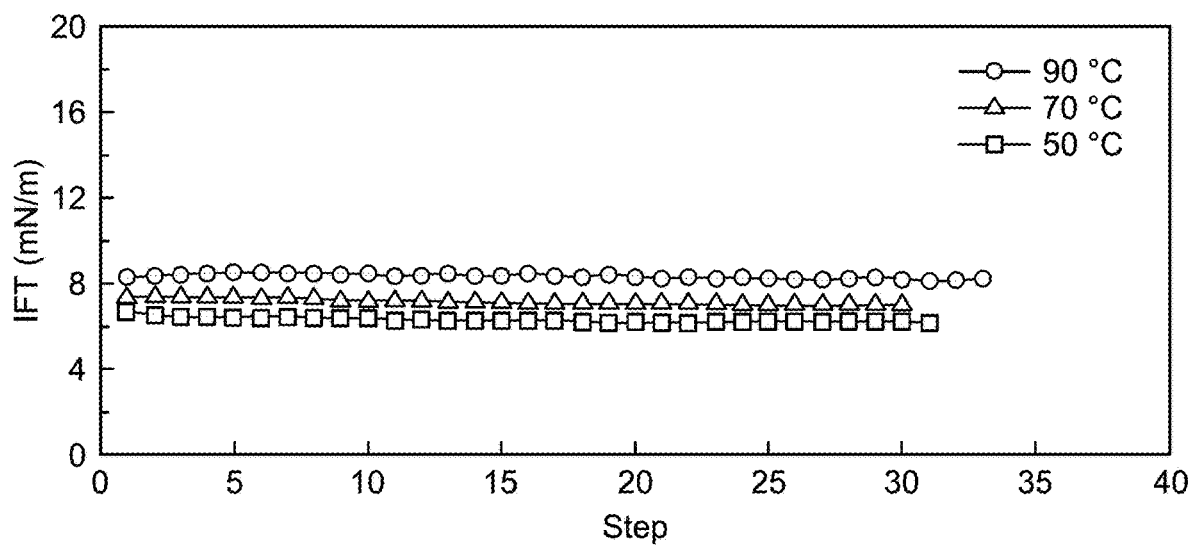
FIG. 8 shows spin drop tensiometer IFT results for X3 at 0.5 gpt in fracturing base fluid at different temperatures with a spinning speed of 10000 rpm, according to certain embodiments.

Further, IFT was measured using a spin drop tensiometer for X3 at different concentrations of 0.5 gpt and 1 gpt, in different salt compositions. FIG. 7 illustrates IFT results with 0.5 gpt of ionic liquid X3 in a 5 wt. % KCl solution. The measurements were conducted at three temperatures, with a constant spinning speed of 10,000 revolution per minute (rpm). At 50° C., the IFT initially measured 16 mN/m, gradually stabilizing at 14.5 mN/m, which is substantially lower than the IFT of 50 mN/m observed in the absence of the ionic liquid. However, there is no distinct trend in IFT with temperature, as the stabilized IFT values remain relatively constant at 14.5 mN/m, 14 mN/m, and 15 mN/m at temperatures of 50° C., 70° C., and 90° C., respectively. In a similar manner, FIG. 8 displays IFT results for X3 with 0.5 gpt of X3 in a fracturing base fluid at three temperatures, at 10,000 rpm. The IFT in the fracturing-based fluid, which contains different salt ions, is lower compared to the IFT observed in a 5 wt. % KCl brine which agrees with the surface tension observation of improved ionic liquid performance in the presence of divalent salts in the solution. At 50° C., the IFT stabilizes at 6.2 mN/m, a significant reduction from the 14.5 mN/m observed in the 5 wt. % KCl solution. However, as the temperature increases, the IFT values also increase, stabilizing at 6.2 mN/m, 7 mN/m, and 8.2 mN/m at temperatures of 50° C., 70° C., and 90° C., respectively.

Figure 9:
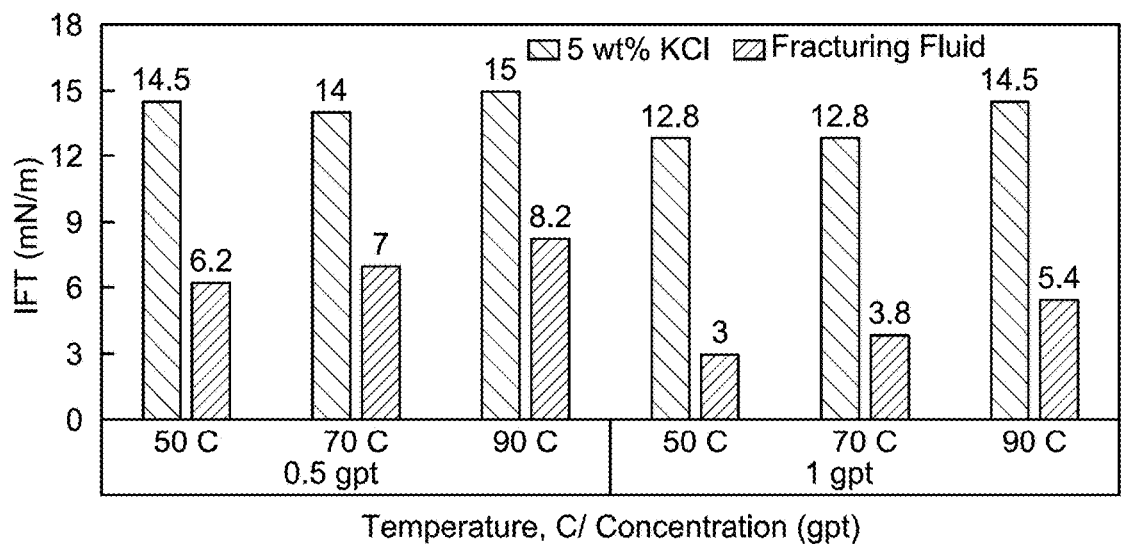
FIG. 9 shows IFT results summary at different ionic liquid concentrations in 5 wt. % KCl and seawater, and at different temperatures, according to certain embodiments.

FIG. 9 illustrates a comprehensive overview of IFT measurements, depicting the influence of temperature, ionic liquid concentration, and salt composition. The graphical representation demonstrates that the introduction of various ions into the brine consistently enhances the efficacy of the ionic liquid in reducing IFT, irrespective of temperature variations or the concentration of the ionic liquids. Moreover, FIG. 9 determines an impact of temperature on IFT in the context of the fracturing-based fluid compared to the 5 wt. % KCl solution. In particular, in the fracturing-based fluid, IFT experiences an upward trajectory with escalating temperatures. As can be seen from FIG. 9, elevating the concentration of the ionic liquid, ranging from 0.5 gpt to 1 gpt, may produce a reduction in IFT. The reduction is evident in the case of the fracturing-based fluid, highlighting the dependence of IFT on ionic liquid concentration within the specific fluid medium. The results may provide insights into the multifaceted interplay of temperature, ionic liquid concentration, and salt composition on the interfacial tension dynamics, particularly in the context of fracturing-based fluid systems.

Among the developed flowback additives in the present disclosure, X3 may be considered as the most effective ionic liquid in the role of a flowback additive. It may be noted that X3 demonstrates the lowest surface tension and IFT, showcasing desirable performance. The efficacy of X3 is particularly high when considering the use of sea water as a fracturing fluid base, where the IFT reaches values lower than 6 mN/m. The value aligns seamlessly with an already established criteria, further validating the superior capabilities of X3 as a flowback enhancer. The ability of X3 to achieve such low IFT ion values, specifically in the challenging context of seawater-based fracturing fluids, underscores its potential significance in improving flowback processes and reducing the associated challenges in tight formations.

Figure 10:
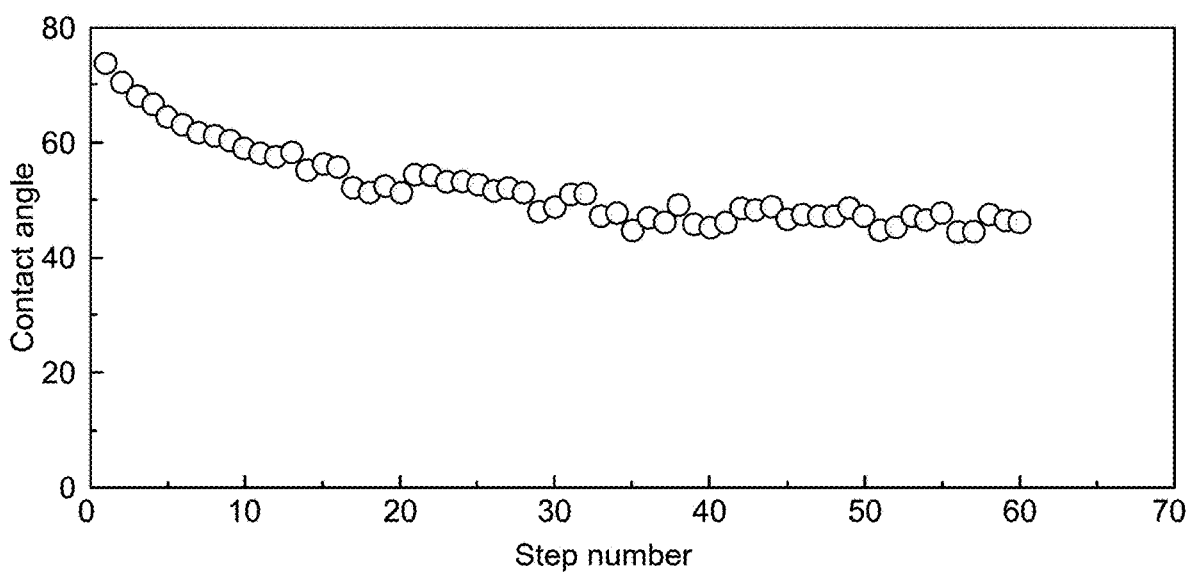
FIG. 10 shows contact angle values for a base fluid of 5 wt. % KCl without ionic liquid, according to certain embodiments.
Figure 11:
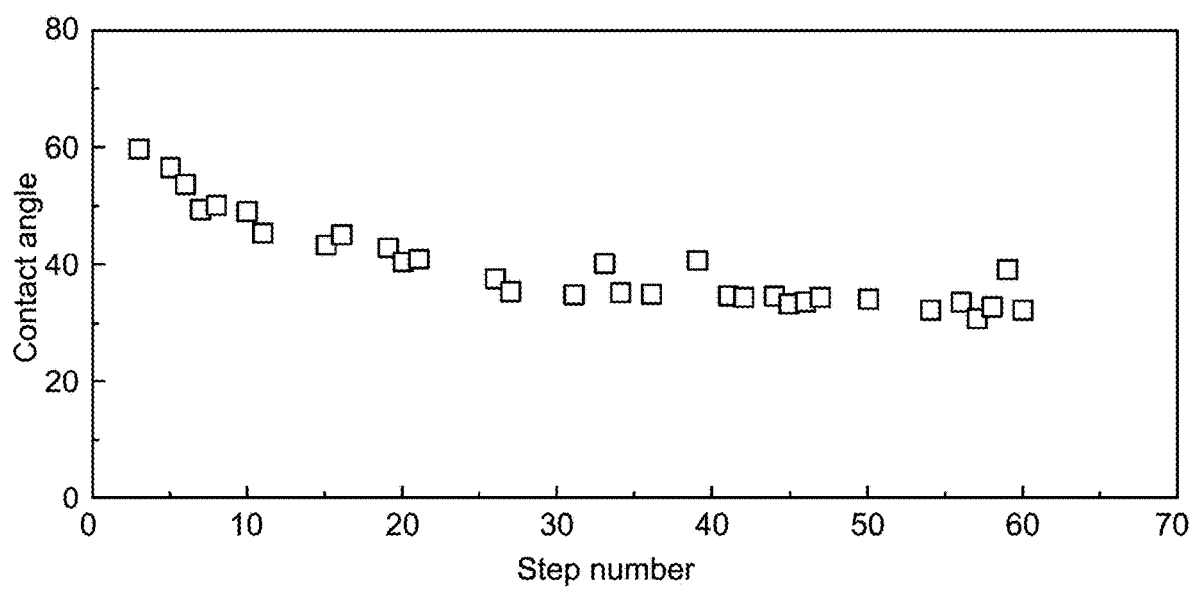
FIG. 11 shows contact angle values for a base fluid of 5 wt. % KCl with 0.5 gpt ionic liquid, according to certain embodiments.
Figure 12B:
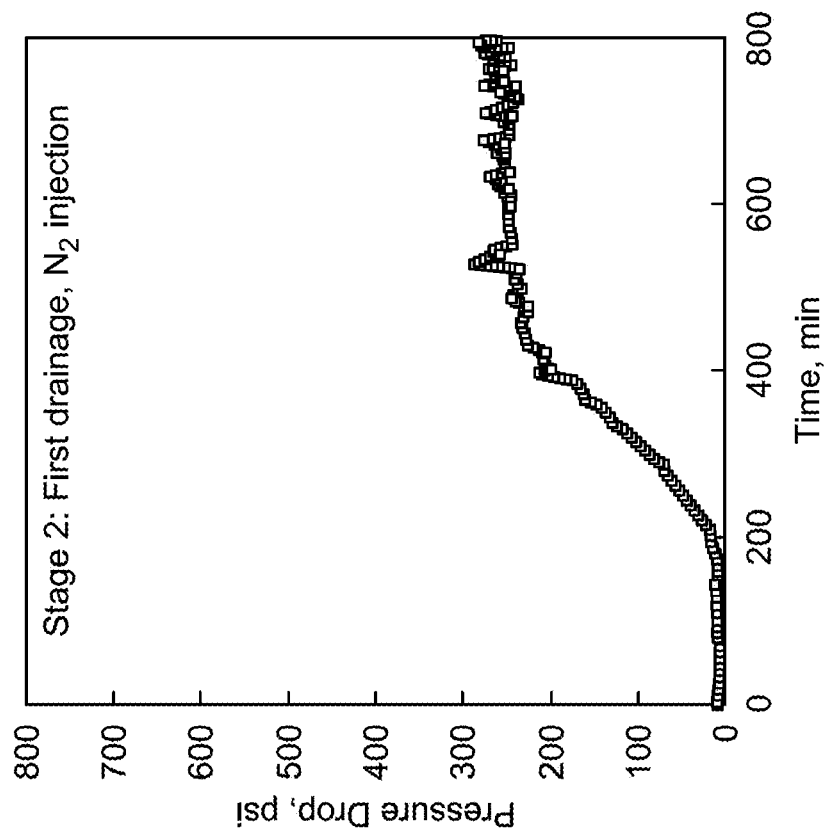
FIG. 12B shows pressure drop across the core at stage 2 during first drainage of $N_2$ injection of core flood experiment 1, according to certain embodiments.
Figure 12A:
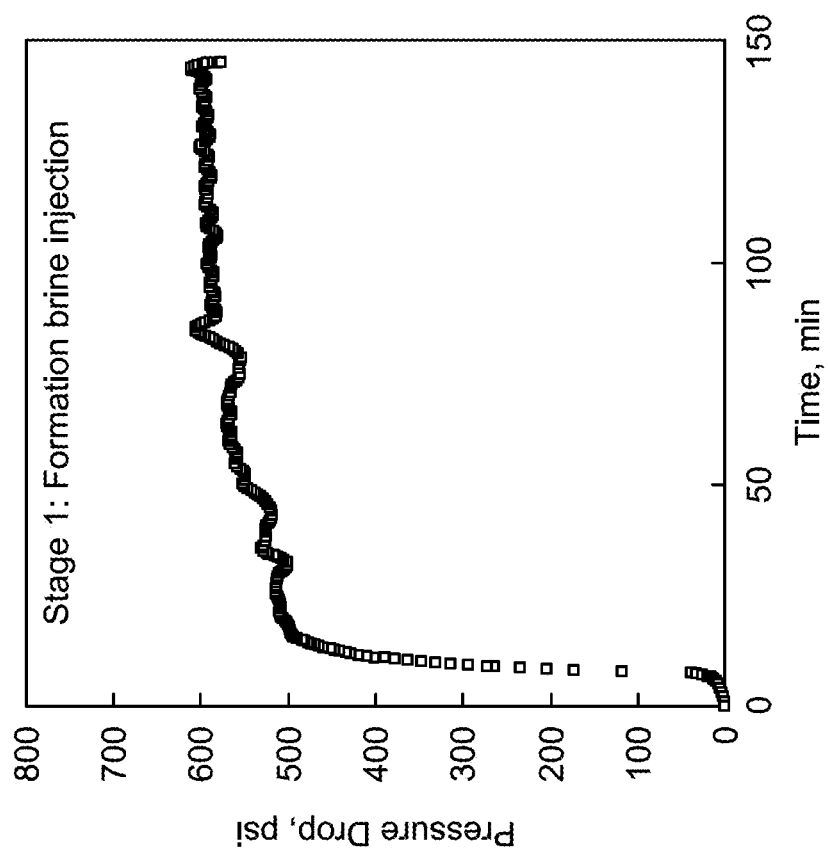
FIG. 12A shows a pressure drop across the core at stage 1 during the formation brine injection of core flood experiment 1, according to certain embodiments.
Figure 12D:
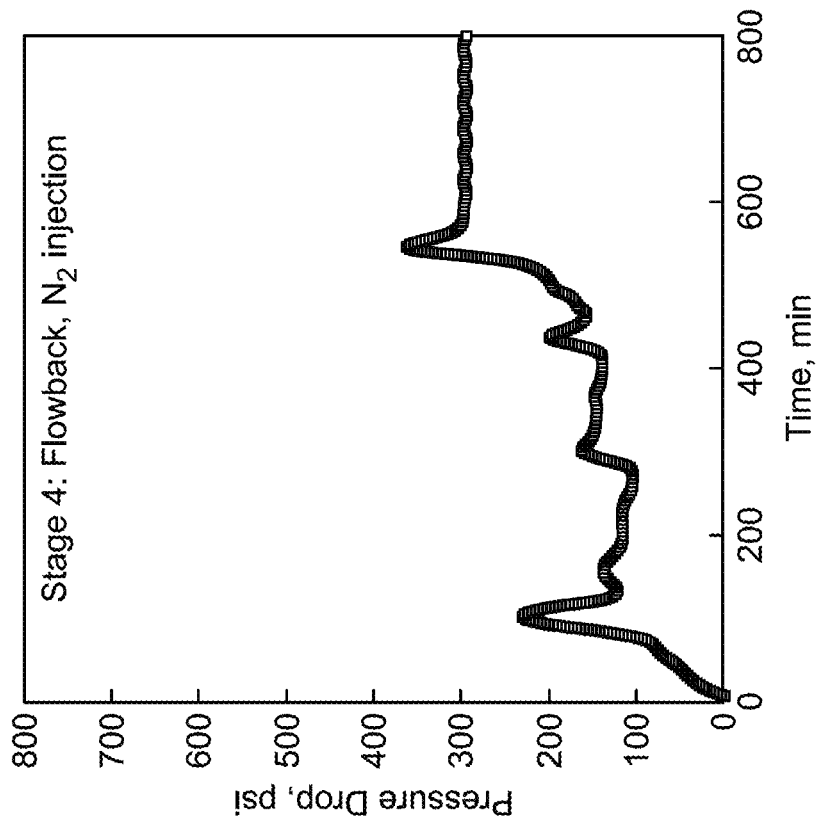
FIG. 12D shows a pressure drop across the core at stage 4 during the flow back of $N_2$ injection of core flood experiment 1, according to certain embodiments.
Figure 12C:
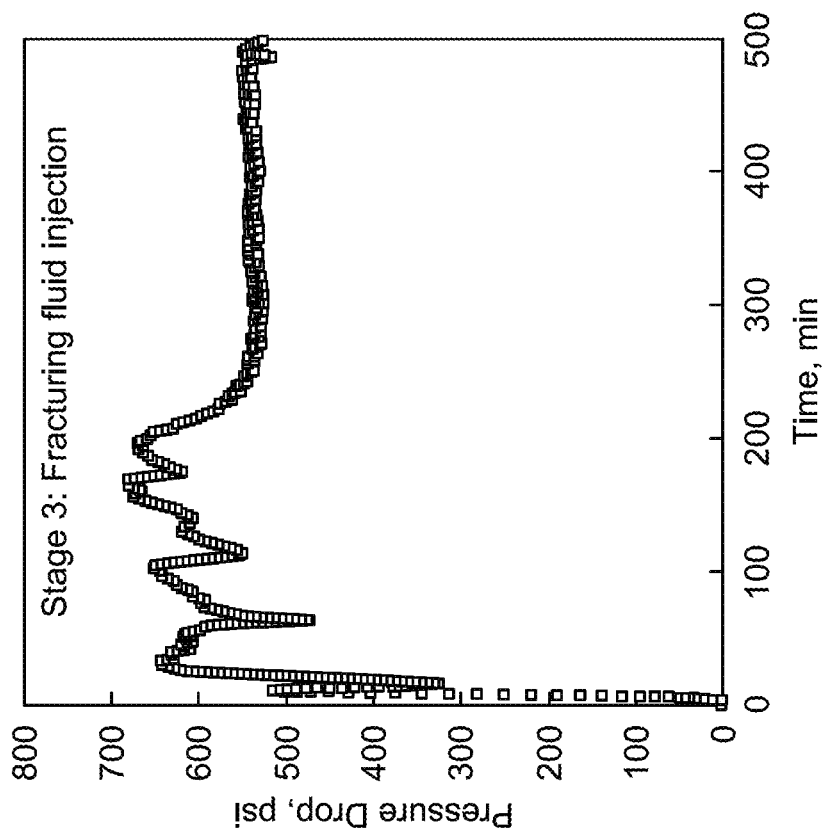
FIG. 12C shows pressure drop across the core at stage 3 during fracturing fluid injection of core flood experiment 1, according to certain embodiments.

Further, the evaluation of contact angles was performed utilizing the sessile drop technique under controlled conditions of 100 pounds per square inch (psi) pressure and a temperature of 50° C., as depicted in FIG. 10 and FIG. 11. In the present disclosure, a $N_2$ bubble was introduced onto a quartz surface immersed in an ionic liquid solution. The initial contact angle for $N_2$ in a 5 wt. % KCl solution was established at 45°. The subsequent introduction of the ionic liquid into the base fluid resulted in a discernible reduction in the contact angle, culminating in a decrease to 33°. The observed decrease in the contact angle signifies a subtle shift toward a more water-wet rock surface. The alteration in the contact angle provides information about the influence of the introduced ionic liquid on wettability characteristics of the rock surface, suggesting a propensity for enhanced water-wetting with the incorporation of ionic liquid into the base fluid. Furthermore, two core flood experiments were conducted following the procedures listed in FIG. 4 on core 1 (using a fracturing fluid without the ionic liquid X3 added) and core 2 (using a fracturing fluid with the ionic liquid X3 added). Table 4 lists the initial preparation results for the core 1 and core 2. The porosity of the cores was found to be 0.17 and 0.16 for core 1 and core 2, respectively, with initial water permeability of 0.14 md and 0.09 md.

TABLE 4

Dimensions and petrophysical properties of Kentucky sandstone cores

| Core | Length (inches) | Diameter (inches) | Porosity (fraction) | $K_{wi}$ (md) |
|---|---|---|---|---|
| Core 1 | 3 | 1.5 | 0.17 | 0.14 |
| Core 2 | 3.2 | 1.5 | 0.16 | 0.09 |

FIGS. 12A-12D illustrate a summary of the pressure drop across core 1 during a plurality of injection stages. In the initial stage of formation brine injection at a rate of 0.5 cm³/min, the pressure drop across the core stabilized at 600 psi, and the initial core permeability was 0.14 md. The first drainage stage persisted for over 800 minutes of $N_2$ injection, where the pressure stabilized at 270 psi. During the stage, $K_{g1}$ was estimated to be 0.058 md, and $S_{wr1}$ was calculated through volumetric considerations to be around 0.58. In addition, for the third stage of fracturing fluid injection without the presence of an ionic liquid, a similar initial water permeability of 0.14 md was observed, with no discernible impact on residual gas saturation. The subsequent flowback stage exhibited a higher stabilized pressure drop of 300 psi, with an estimated $K_{g2}$ of 0.05 md and a higher irreducible water saturation $S_{wr2}$ of 0.61. The behavior is characteristic of tight formations after exposure to fracturing fluids with lower salinity compared to the original salinity of the formation. Lower water salinity leads to a thicker double layer and a more water-wet system, resulting in higher irreducible water saturation and lower effective gas permeability. The permeability loss was determined to be 14% of its initial value, and the increase in irreducible water saturation due to retaining some of the fracturing fluid in the system was estimated to be 6%. The permeability loss was determined to be 14% of its initial value and the increase in irreducible water saturation was due to retention of the fracturing fluid in the system, which was estimated to be around 6%. Following equations may be used to calculate the change in gas permeability and the change in water saturation, $$\text{Change in the gas permeability } (dKg) = \frac{Kg2 - Kg1}{kg1} = \frac{0.05 - 0058}{0.058} = -0.14 = -14\%$$

$$\text{Change in water saturation } (dSw) = \frac{0.61 - 0.58}{0.58} = 6\%$$

The aforementioned results indicate that the recovered fractured fluid volume decreased by 6% from the base.

Figure 13A:
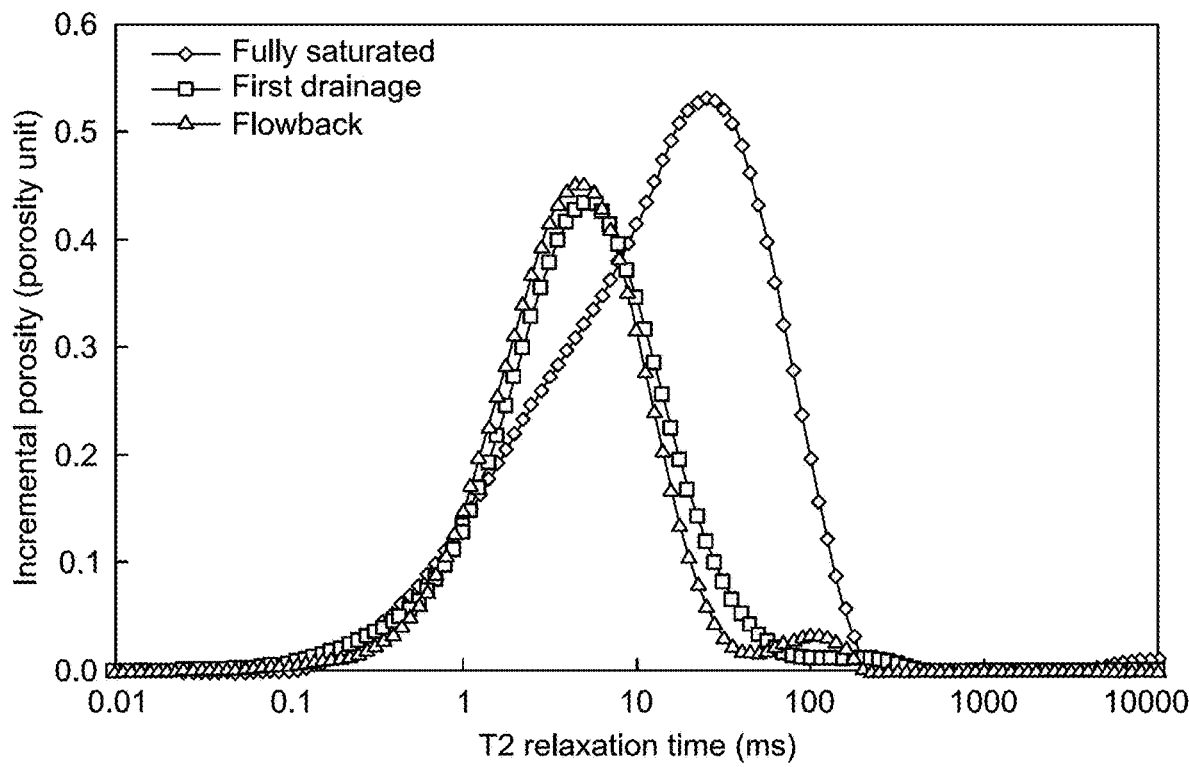
FIG. 13A shows nuclear magnetic resonance (NMR) analysis for core flood experiment 1 without adding flowback aids to determine incremental porosity in the core, versus T2 relaxation time, according to certain embodiments.
Figure 13B:
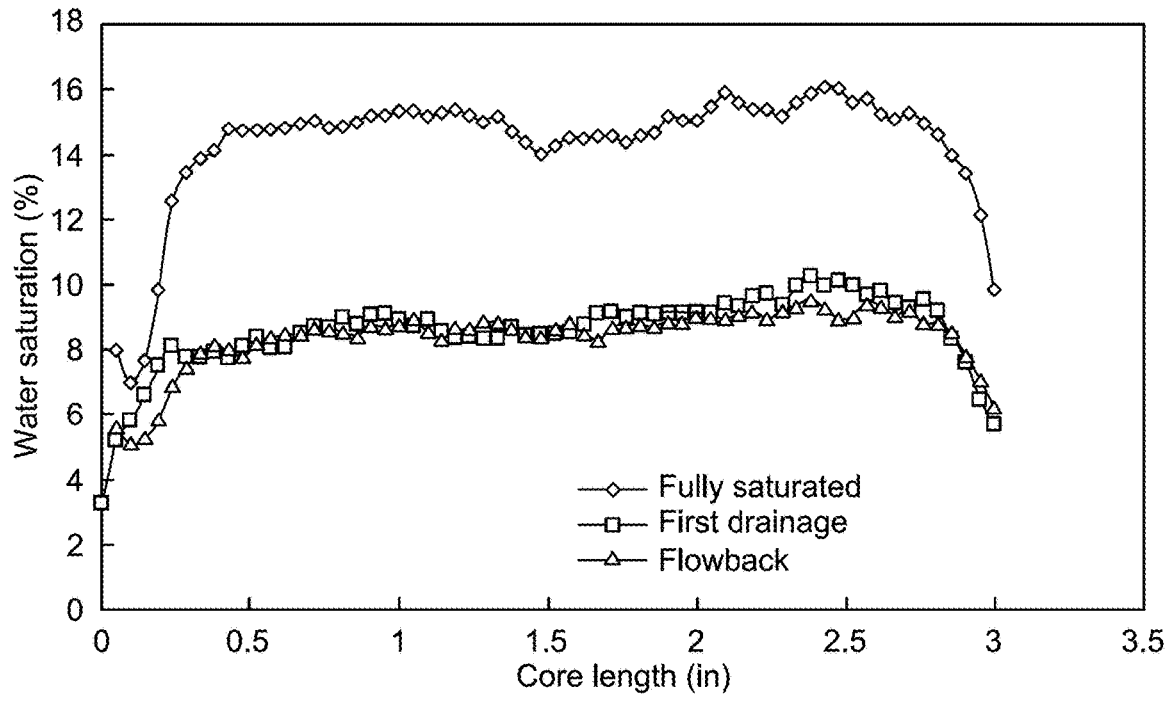
FIG. 13B shows NMR analysis for core flood experiment 1 without adding flowback aids to determine water saturation distribution at different stages, according to certain embodiments.
Figure 14B:
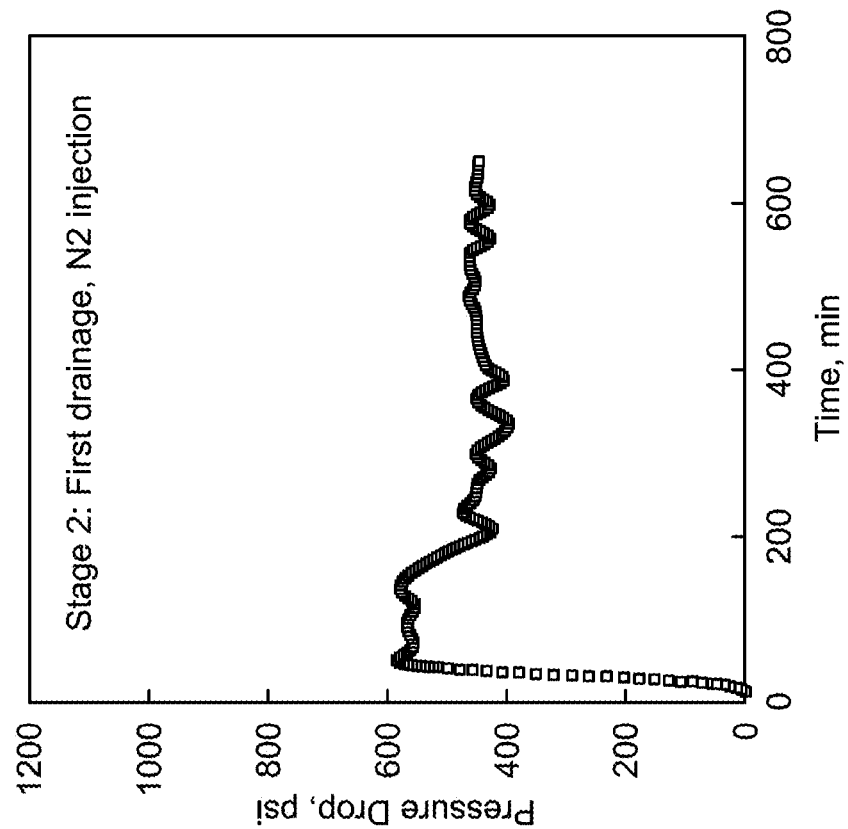
FIG. 14B shows a pressure drop across the core at stage 2 during the first drainage of $N_2$ injection during core flood experiment 2, according to certain embodiments.
Figure 14A:
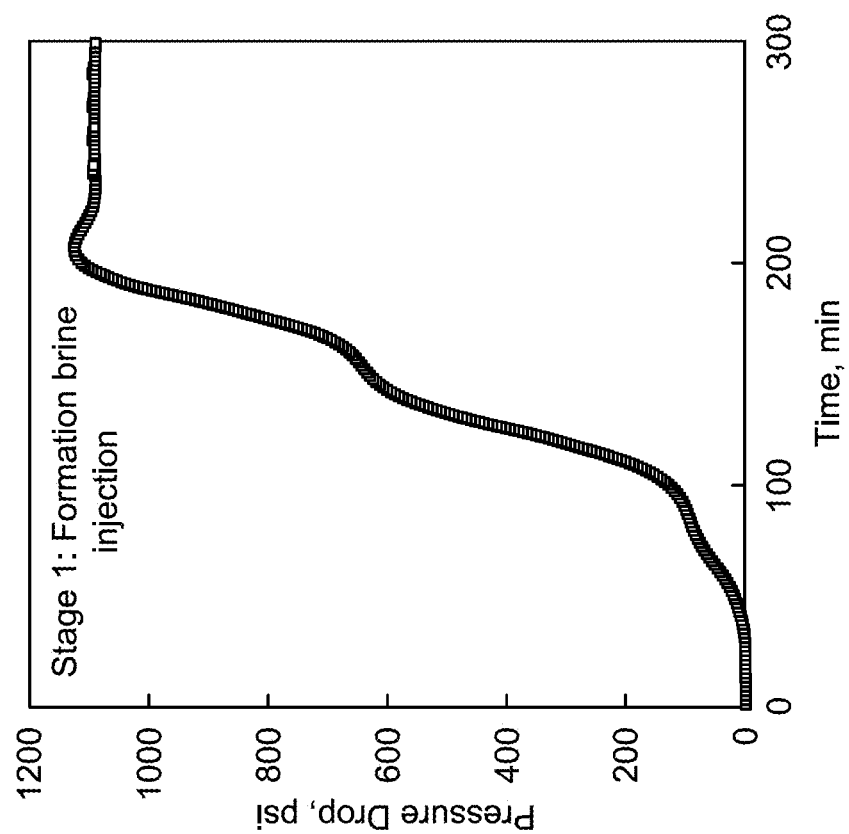
FIG. 14A shows a pressure drop across the core at stage 1 during formation brine injection during core flood experiment 2, according to certain embodiments.
Figure 14D:
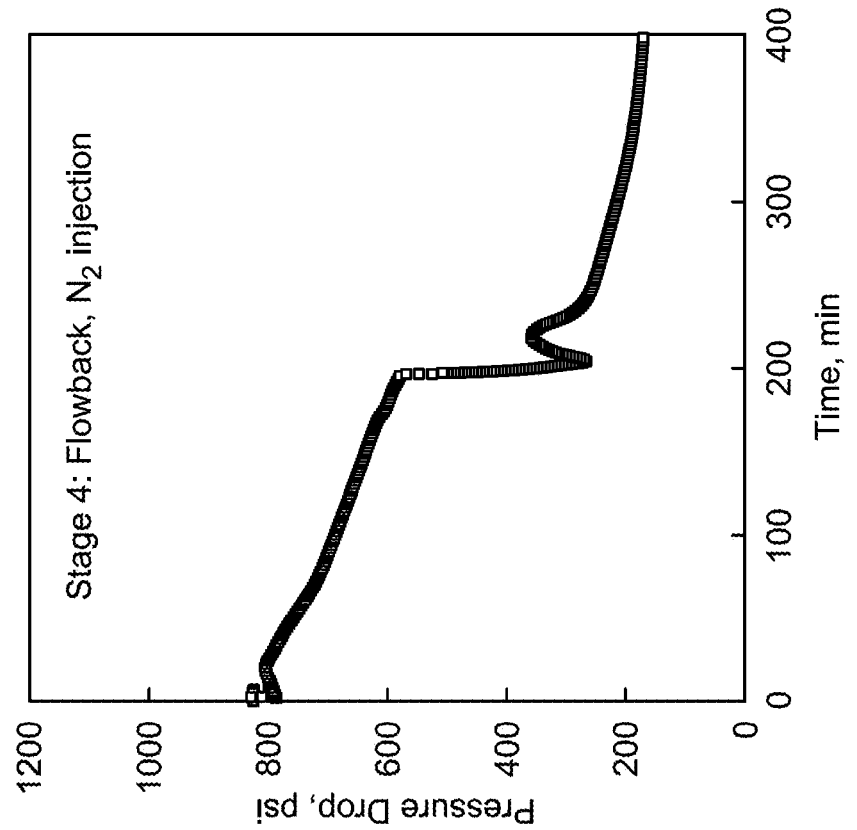
FIG. 14D shows a pressure drop across the core at stage 4 during the flowback of $N_2$ injection during core flood experiment 2, according to certain embodiments.
Figure 14C:
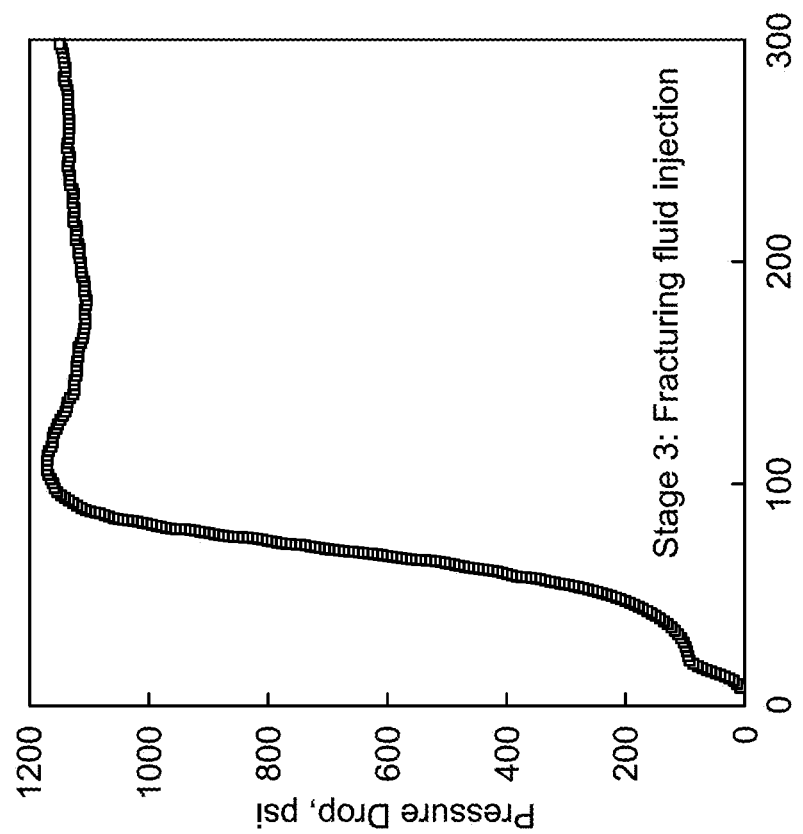
FIG. 14C shows a pressure drop across the core at stage 3 during fracturing fluid injection during core flood experiment 2, according to certain embodiments.

The water distribution within the core 1 underwent further examination using NMR measurements. In FIG. 13A, the incremental porosity is depicted as a function of T2 relaxation time for various stages for core 1, including fully saturated, first drainage, and flowback stages. FIG. 13A illustrate that $N_2$ injection displaces water from larger pores, with a majority of the water retained in smaller pores. It may be noted that after the flowback stage, when the core was exposed to fracturing fluids, a slightly higher amount of water remained in the larger pores. FIG. 13B illustrates the estimated water volume distribution along the core 1, revealing a nearly identical water displacement pattern in both the first drainage and flowback stages.

In addition, the aforementioned procedures were performed on core 2, with the addition of 0.5 gpt of X3 to the fracturing fluid. FIGS. 14A-14D provide a summary of the pressure drop across core 2 during various injection stages. A comparable analysis was executed to assess rock permeability and water saturation. The effective gas permeability in the flowback stage exceeded that of the first drainage stage by 25%. Furthermore, a reduced irreducible water saturation was observed post-flowback stage treatment with flowback additives, where the irreducible water saturation decreased to 0.44, marking a 21% reduction from the original value. The findings were corroborated through NMR measurements.

The first drainage stage persisted for over 700 minutes of $N_2$ injection, where the pressure stabilized at 420 psi. During the stage, $K_{g1}$ was estimated to be 0.04 md, and $S_{wr1}$ was calculated through volumetric considerations to be 0.56 in the third stage of fracturing fluid injection in the presence of the ionic liquid X3. The subsequent flowback stage exhibited a lower stabilized pressure drop of 200 psi, with an estimated $K_{g2}$ of 0.05 md and a lower irreducible water saturation $S_{wr2}$ of 0.44. The relative permeability gain was determined to be 25% of its initial value, $$dKg = \frac{0.05 - 0.04}{0.04} = 25\%$$

and the reduction in irreducible water saturation due to better flowback was estimated to be 21%, $$dSw = \frac{0.44 - 0.56}{0.56} = -21\%.$$

Change in the gas permeability $dKg = \frac{Kg2 - Kg1}{kg1}$

Change in water saturation $dSw = \frac{Swr2 - Swr1}{Swr1}$

The properties of the two cores, described herein, are sufficiently similar with experimentally insignificant difference. In addition, the conclusions obtained from the present disclosure are based on relative values. For example, the change in the permeability was estimated as a function of the initial permeability. In a similar manner, the change in the water saturation was estimated as a function of the initial water saturation. In other words, $$dKg = \frac{Kg2 - Kg1}{kg1} \text{ and } dSw = \frac{Swr2 - Swr1}{Swr1}$$

are both relative values instead of absolute values. While length, porosity and Kwi of the two cores are not exactly the same, their differences are self-normalized when the relative values of dKg and dSw are calculated. As a result, core 1 and core 2 can be compared with each other to make reliable conclusions about the effect of the ionic liquid X3.

Figure 15A:
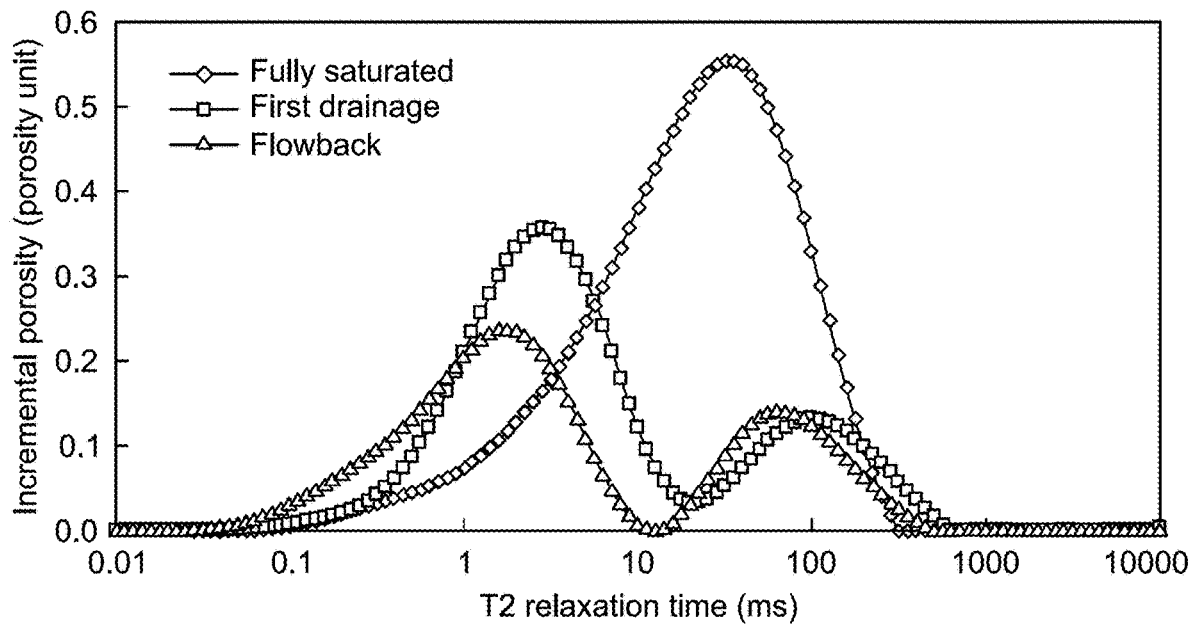
FIG. 15A depicts NMR analysis for core flood experiment 2 by adding flowback aids to determine incremental porosity in the core versus T2 relaxation time, according to certain embodiments.
Figure 15B:
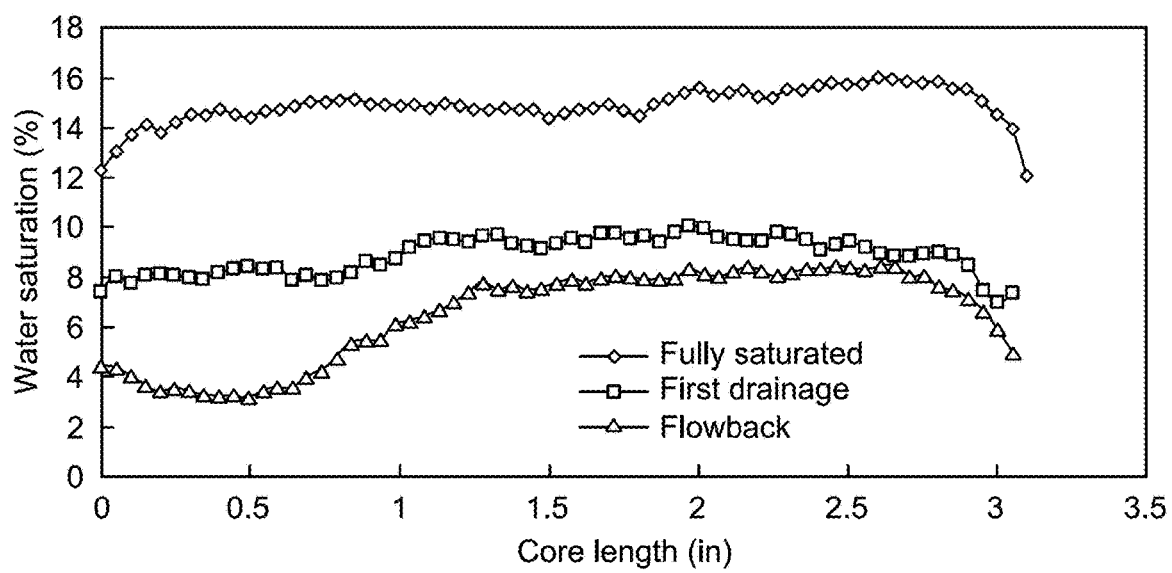
FIG. 15B depicts NMR analysis for core flood experiment 2 by adding flowback aids to determine water saturation distribution at different stages, according to certain embodiments.

In FIG. 15A, the incremental porosity is displayed as a function of T2 relaxation time for different stages for core 2. Treating the rock with flowback aids enhanced the displacement behavior of the fracturing fluids by $N_2$, leading to a higher recovery of fracturing fluid during the flowback stage. FIG. 15B illustrates the estimated water saturation distribution along the core 2. As can be seen from FIG. 15B, a greater water displacement during the flowback stage compared to the first drainage stage, consistent with volumetric calculations.

According to the present disclosure, different experimental analyses were conducted to investigate different concentrations of methylimidazolium chloride-based ionic liquids (X1, X2, and X3). Ionic liquids demonstrated favorable surface tension reduction, where longer carbon chains led to lower values. The length of the carbon chain in the ionic liquids played a role, with longer chains resulting in lower surface tension values Introducing diverse ions, especially divalent ions, enhanced the performance of ionic liquids. The introduction of various ions, particularly divalent ions, enhanced the performance of ionic liquids in reducing surface tension. IFT measurements revealed that adding the ionic liquid X3 to both 5 wt. % KCl and the fracturing base fluid significantly reduced IFT compared to corresponding fluids without the ionic liquid. Stabilized IFT values at different temperatures did not follow a predictable pattern, with temperature exerting a more pronounced effect on IFT in the case of the fracturing base fluid. Contact angle measurements showed that introducing ionic liquid into the base fluid shifted rock surface wettability slightly towards being more water-wet. The use of ionic liquids improved regained permeability by 25% compared to the base fluid, enhancing fracturing fluid recovery to approximately 56% of the injected volume. Thus, methylimidazolium chloride-based ionic liquids may be used as environmentally friendly flowback additives, especially in harsh conditions of high temperature (e.g. 50-100° C.) and high salinity (e.g. 20,000-90,000 ppm of $Na^+$) where the conventional additives are unfavorable. The flowback additive formulation offers an efficient yet effective solution by reducing surface and interfacial tensions, thus lowering water blockage without the toxic effects of traditional surfactants. The ionic liquids demonstrate consistent performance in reducing interfacial tension across various temperature ranges and in the presence of divalent ions, offering a robust solution adaptable to diverse fracturing fluid compositions.

Numerous modifications and variations of the present disclosure are possible in light of the above teachings. It is therefore to be understood that within the scope of the appended claims, the invention may be practiced otherwise than as specifically described herein.

The invention claimed is:
1. A method of fracturing fluid recovery, comprising:
injecting a fracturing fluid into a subterranean reservoir via a wellbore, the fracturing fluid comprising a carrier fluid, a proppant and an ionic liquid;
increasing a pressure within the wellbore to create or extend fractures in the subterranean reservoir;
injecting the fracturing fluid into the fractures;
recovering the fracturing fluid by allowing the fracturing fluid to flow back while leaving the proppant within the fractures,
executing a drainage process by injecting a drainage gas into the formation to remove a portion of a formation fluid naturally present in the subterranean reservoir, wherein the drainage gas comprises: nitrogen, methane, ethane, or any combinations thereof; and
wherein a regained gas permeability during the recovering is 25% higher than a gas permeability during the executing.
2. The method of claim 1, wherein:
the ionic liquid includes at least one selected from the group consisting of 1-butyl-3-methylimidazolium chloride, 1-hexyl-3-methylimidazolium chloride and 1-decyl-3-methylimidazolium chloride.

3. The method of claim 1, wherein:
the ionic liquid includes 1-decyl-3-methylimidazolium chloride.

4. The method of claim 3, wherein:
the recovering has a fracturing fluid recovery volume percentage of 56% relative to a total volume of the fracturing fluid injected into the wellbore.

5. The method of claim 3, wherein:
the fracturing fluid has an interfacial tension of 1-10 mN/m at a temperature of 25° C. to 90° C. when the ionic liquid has a concentration of 0.5-1 gallon per thousand units (gpt) in the fracturing fluid.

6. The method of claim 3, wherein:
the fracturing fluid has a water contact angle of 25° to 65°.

7. The method of claim 3, wherein:
the fracturing fluid has a surface tension of about 35 mN/m when the ionic liquid has a concentration of 400 to 1,400 parts per million (ppm) in the fracturing fluid.

8. The method of claim 1, wherein:
the executing comprises injecting the nitrogen gas; and
the recovering comprises reducing the pressure within the wellbore or injecting the nitrogen gas again.

9. The method of claim 1, wherein:
the subterranean reservoir includes a formation fluid that has a higher salinity than the fracturing fluid.

10. The method of claim 9, wherein:
the formation fluid has about 59,491 ppm of $Na^+$ based on a total weight of the formation fluid, and
the fracturing fluid has about 18,414 ppm of $Na^+$ based on a total weight of the fracturing fluid.

11. The method of claim 9, wherein the subterranean reservoir includes a formation fluid comprising, based on a total weight of the formation fluid:
20,000-90,000 ppm of $Na^+$;
0-100 ppm of $K^+$;
10,000-30,000 ppm of $Ca^{2+}$;
1,000-4,000 ppm of $Mg^{2+}$;
100,000-160,000 ppm of $Cl^-$;
50-800 ppm of $SO_4^{2-}$; and
50-800 ppm of $HCO_3^-$.

12. The method of claim 9, wherein the fracturing fluid comprises, based on a total weight of the fracturing fluid:
10,000-30,000 ppm of $Na^+$;
200-900 ppm of $K^+$;
200-900 ppm of $Ca^{2+}$;
1,000-4,000 ppm of $Mg^{2+}$;
10,000-60,000 ppm of $Cl^-$;
1,000-6,000 ppm of $SO_4^2$; and
0-100 ppm of $HCO_3^-$.

13. The method of claim 1, wherein:
the ionic liquid has a concentration of 0.5 to 1 gallon per thousand units (gpt) in the fracturing fluid.

14. The method of claim 1, wherein:
the ionic liquid has a concentration of 10 to 700 parts per million (ppm) in the fracturing fluid.

15. The method of claim 1, wherein:
the fracturing fluid is injected into the wellbore at a temperature of 25° C. to 90° C.

16. The method of claim 1, wherein the subterranean reservoir has a solid phase comprising, based on a total weight of the solid phase:
50-80 wt. % of quartz;
10-20 wt. % of illite;
1-10 wt. % of potassium feldspar; and
10-25 wt. % of plagioclase.

17. The method of claim 16, wherein the solid phase comprises Kentucky sandstones.

* * * * *